United States Patent [19]
Ando et al.

[11] Patent Number: 6,152,393
[45] Date of Patent: Nov. 28, 2000

[54] WEBBING WINDING DEVICE

[75] Inventors: Takayuki Ando; Kenji Hoshino, both of Aichi-ken, Japan

[73] Assignee: Kabushiki Kaisha Tokai-Rika-Denki-Seisakusho, Aichi-Ken, Japan

[21] Appl. No.: 09/297,029

[22] PCT Filed: Nov. 6, 1997

[86] PCT No.: PCT/JP97/04046

§ 371 Date: Jun. 28, 1999

§ 102(e) Date: Jun. 28, 1999

[87] PCT Pub. No.: WO98/19896

PCT Pub. Date: May 14, 1998

[30] Foreign Application Priority Data

Nov. 6, 1996 [JP] Japan .................................. 8-294041

[51] Int. Cl.[7] .................... B60R 22/405; B60R 22/41; B60R 22/415
[52] U.S. Cl. .................... 242/382.2; 242/383.1; 242/383.5
[58] Field of Search .............. 242/382.2, 383.1, 242/383.5, 384.1; 280/806; 297/478

[56] References Cited

FOREIGN PATENT DOCUMENTS

| 0 655 372 | 5/1995 | European Pat. Off. . |
|---|---|---|
| 6-16164 | 3/1994 | Japan . |
| 6-35060 | 5/1994 | Japan . |
| 6-37022 | 5/1994 | Japan . |
| 7-277137 | 10/1995 | Japan . |

Primary Examiner—John M. Jillions
Attorney, Agent, or Firm—Nixon Peabody LLP; Thomas W. Cole

[57] ABSTRACT

A webbing take-up device 10 which takes up a webbing which is attached by a vehicle occupant, comprising: a rotor member 50 which rotates integrally with a take-up shaft 14 which takes up the webbing; a lock wheel 32 which is rotatably supported at the take-up shaft 14 and which rotates relatively with the take-up shaft 14, thereby deterring the take-up shaft 14. from rotating in a direction in which the webbing is pulled out; a slider 70 which engages the rotor member 50 and the lock wheel 32 with each other so as to deter the take-up shaft 14 and the lock wheel 32 from rotating relatively with each other between a state in which almost an entire amount of the webbing is taken up by the take-up shaft 14 and a state in which the entire amount of the webbing is taken up by the take-up shaft 14. As a result, it is possible to prevent end lock reliably.

8 Claims, 17 Drawing Sheets

WEBBING WINDING DEVICE

TECHNICAL FIELD

The present invention relates to a webbing take-up device equipped with webbing sensitive type lock means having an end lock prevention mechanism.

BACKGROUND ART

In a webbing take-up device with which a vehicle is equipped, there is provided a webbing take-up device having a so-called webbing sensitive type (WSIR: Webbing Sensitive Inertia Reel) lock means in which, in accordance with a rapid pulling out of a webbing, rotation of a lock wheel is delayed, a take-up shaft and the lock wheel rotate relatively to each other, the lock means operates, the take-up shaft is stopped from rotating in a direction in which the webbing is pulled out, and the webbing is instantaneously prevented from being pulled out.

In this webbing sensitive type webbing take-up device, when an operation of the lock means is canceled, the operation of the lock means is cancelled by rotating the take-up shaft in a small amount in the direction in which the webbing is pulled out.

However, when fastening of the webbing is released by a vehicle occupant, since the take-up shaft is energized by energizing means in the direction in which the webbing is taken up, when the vehicle occupant unfastens the webbing, the webbing may be rapidly taken up. In such a state, when the taking up of the webbing has been completed, the rotation of the take-up shaft is rapidly terminated. The webbing take-up device is thereby in the same state as that when the webbing is rapidly pulled out, and there are cases in which the lock means operates.

In this case, the webbing is set in a state in which the entire amount of the webbing is taken up. There is no longer any allowance for the take-up shaft to rotate in the direction in which the webbing is taken up. Accordingly, there arises a drawback (end lock) in which it becomes difficult to release the lock means.

Therefore, conventionally, there has been proposed a webbing take-up device that solves this drawback (Japanese Patent Application Laid-Open (JP-A) No. 62-95058).

With reference to FIG. 17, a webbing take-up device of this type will be described hereinafter. A lock wheel 306 is rotatably supported at one end portion 304A of a take-up shaft 304 for taking up a webbing 302. A pair of lock plates 312 are disposed at the lock wheel 306. The pair of lock plates 312 mesh with an internally toothed gear 310 which is fixed to a frame 308, and thereby prevents the rotation of a take-up shaft 14. Further, a rotor 314, which rotates integrally with the take-up shaft 304, is connected to the one end portion 304A of the take-up shaft 304. A boss portion 316A of a cam 316 is inserted into the rotor 314. The cam 316 can rotate due to a frictional force between the rotor 314 and the cam 316. This cam 316 is held by a friction spring 320 provided at a cover body 318 by a force that is stronger than the frictional force between the rotor 314 and the cam 316.

A twisting coil spring 322 is disposed between the lock wheel 306 and the rotor 314. The twisting coil spring 322 energizes the lock wheel 306 in the direction in which the webbing is pulled out (the direction of arrow B in FIG. 17).

A protruding portion 324 is formed at the aforementioned lock wheel 306. A pawl 326 which is rotatably supported by a pin 314A of the rotor 314 is able to abut this protruding portion 324.

In the webbing take-up device which is structured as described above, when the webbing is taken up, if the take-up shaft 304 rotates in the direction in which the webbing is taken up (the direction of arrow A in FIG. 17), the rotor 314 rotates integrally with the take-up shaft 304. In this case, the rotational force of the rotor 314 is transmitted to the cam 316 through a predetermined frictional force; however, because the cam 316 is held by the friction spring 320, the cam 316 does not rotate.

Therefore, one end portion 326A of the pawl 326 abuts a notched surface 316B of the cam 316, and the pawl 326 thereby rotates around the pin 314A as a center in the direction of arrow C. Accordingly, the pawl 326 engages with the protruding portion 324 of the lock wheel 306, and thereby prevents the lock wheel 306 and the take-up shaft 304 from rotating relatively with each other.

As a result, when all of the webbing is taken up, since the take-up shaft 304 is not locked by the lock plates 312, the webbing 302 can be pulled out easily.

In a webbing take-up device having such a conventional end lock prevention mechanism as described above, because the cam 316 is solely held by the friction spring 320, when the webbing is rapidly taken up, the cam 316 rotates by the frictional force between the rotor 314 and the cam 316, and end lock is thereby caused.

DISCLOSURE OF THE INVENTION

In view of the aforementioned, it is an object of the present invention to newly provide a webbing take-up device having webbing sensitive type lock means in which, even when an entire amount of the webbing is taken up rapidly, the webbing sensitive type lock means operates reliably. Accordingly, it is possible to prevent end lock.

In accordance with a first aspect of the present invention, there is provided a webbing take-up device, comprising: a frame which is mounted to a vehicle; a take-up shaft which is axially supported at the frame, and which takes up a webbing for restraining a vehicle occupant; a lock wheel which following rotates around the take-up shaft, and which rotates relatively with the take-up shaft due to rapid rotation of the take-up shaft; lock means which prevents the take-up shaft from rotating in a direction in which the webbing is pulled out when the lock wheel and the take-up shaft rotate relatively with each other; a planet gear which revolves around an axis core of the take-up shaft due to rotation of the take-up shaft and transmits reduced rotation of the take-up shaft as a revolution rotational frequency; and end lock preventing means which is driven in accordance with revolution of the planet gear and prevents the lock wheel and the take-up shaft from rotating relatively with each other in between a state in which almost the entire amount of the webbing is taken up by the take-up shaft and a state in which the entire amount of the webbing is taken up by the take-up shaft.

Since the present invention is structured as described above, the end lock preventing means deters the take-up shaft and the lock wheel from rotating relatively with each other, between the state in which almost the entire amount of the webbing is taken up by the take-up shaft and the state in which the entire amount of the webbing is taken up by the take-up shaft. As a result, the webbing sensitive type lock means operates so as to prevent the webbing from causing end lock reliably.

In accordance with a second aspect of the present invention, there is provided a webbing take-up device having webbing sensitive type lock means, comprising: a rotor member which rotates integrally with a take-up shaft which takes up the webbing; a lock wheel which is rotatably supported at the take-up shaft and which prevents the take-up shaft from rotating in a direction in which the webbing is pulled out when the take-up shaft and the lock wheel rotate relatively with each other; a braking member which is supported by the rotor member so as to be movable, which is inserted into an insertion portion for braking provided at the lock wheel so as to prevent the rotor member and the lock wheel from rotating relatively with each other, and which is removed from the insertion portion for braking so as to allow the rotor member and the lock wheel to rotate relatively with each other; and reduction interlocking means which interlocks with rotation of the take-up shaft, which inserts the braking means into the insertion portion for braking between a state in which almost an entire amount of the webbing is taken up and a state in which the entire amount of the webbing is taken up, and which removes the braking member from the insertion portion for braking in between a state in which almost the entire amount of the webbing is taken up and a state in which the entire amount of the webbing is pulled out.

Since the present invention is structured as described above, the reduction interlocking means interlocks with the rotation of the take-up shaft 14 when the webbing is taken up by the take-up shaft 14, and inserts the braking means into the insertion portion for braking between the state in which almost the entire amount of the webbing is taken up by the take-up shaft and the state in which the entire amount of the webbing is taken up by the take-up shaft, and prevents the rotor member and the lock wheel from rotating relatively with each other. Accordingly, the webbing sensitive type lock means can operate so as to prevent end lock reliably.

In accordance with a third aspect of the present invention, there is provided a webbing take-up device according to the second aspect of the present invention, wherein the reduction interlocking means is formed by a gear mechanism having a planet gear.

By structuring the present invention as described above, the rotation of the take-up shaft when the webbing is pulled out is greatly reduced by the gear mechanism having the planet gear. It is possible to operate the braking member reliably and structure the reduction interlocking means in a simple manner.

BEST MODE FOR IMPLEMENTING THE INVENTION

In a webbing take-up device according to an embodiment of the present invention, the webbing take-up device can usually take up and pull out the webbing, comprises both a so-called ELR (i.e., Emergency Locking Retractor) and a so-called ALR (i.e., Automatic Locking Retractor), and has integrally provided therein an end lock prevention mechanism. In the ELR, at the time of a rapid deceleration of a vehicle, this state is detected by an acceleration sensor, and the ELR instantaneously prevents a take-up shaft from rotating in the direction in which the webbing is pulled out. In the ALR, after an arbitrary amount of the webbing has been pulled out, even when the webbing is taken up by a minimum amount, the ALR automatically prevents the webbing from being pulled out anymore, and when almost an entire amount of the webbing is taken up by the webbing take-up device, the ALR cancels this state in which the pulling out of the webbing is prevented, thereby allowing the webbing to be pulled out again.

Figure 6:
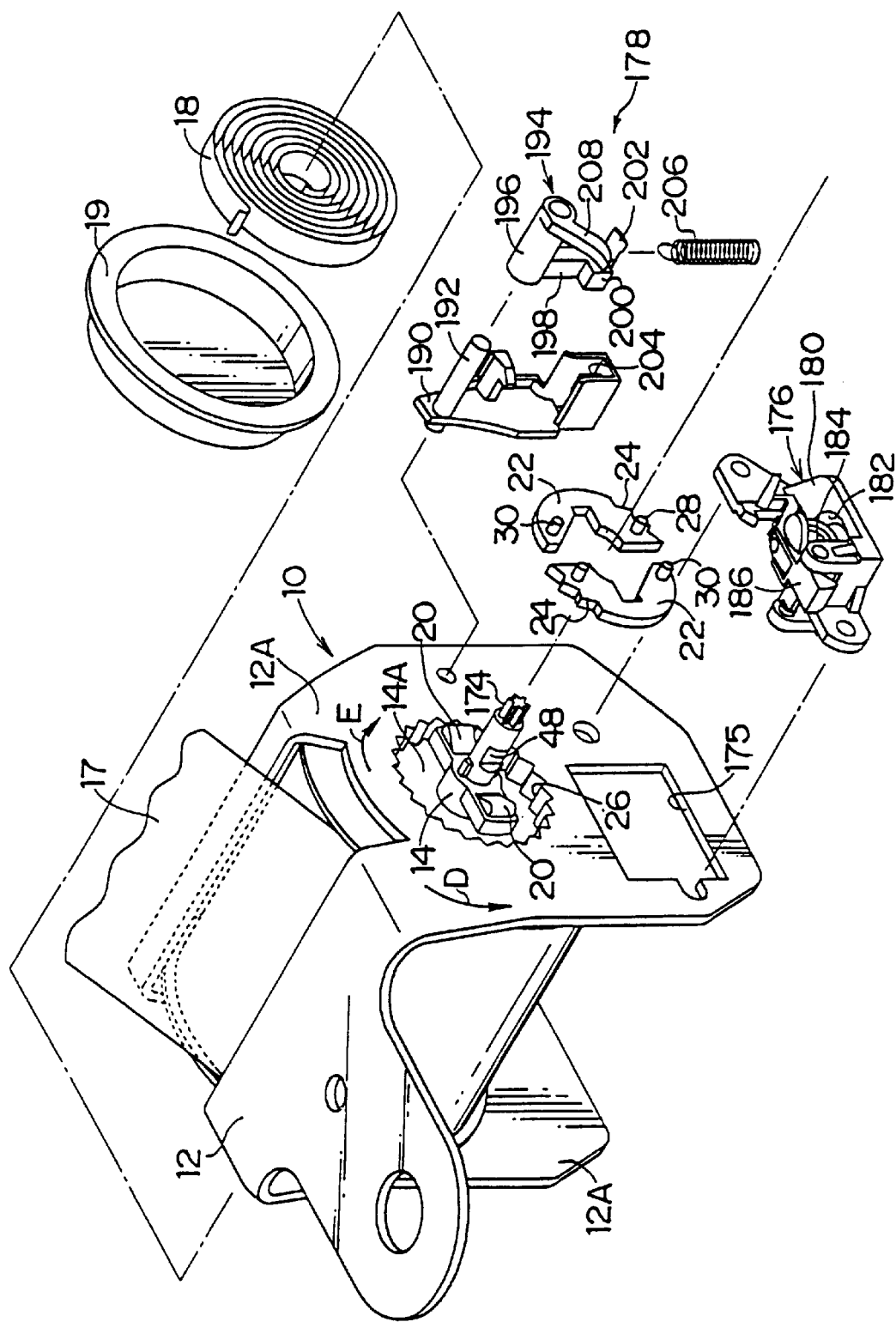
FIG. 6 is an exploded perspective view that illustrates a portion of the webbing take-up device relating to the present embodiment when viewed from one side.
Figure 7:
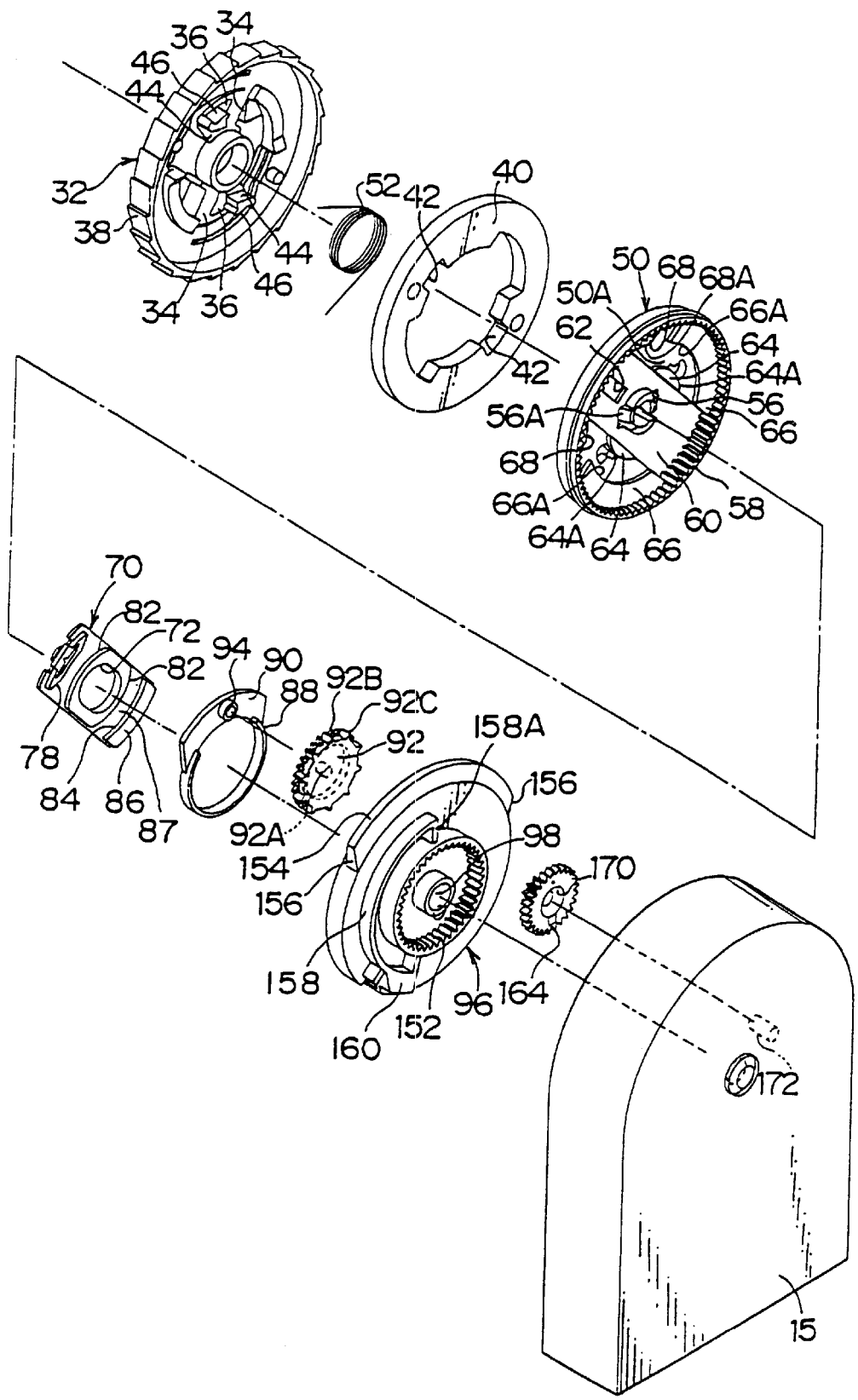
FIG. 7 is an exploded perspective view that illustrates another portion of the structure shown in FIG. 6 of the webbing take-up device relating to the present embodiment when viewed from one side.
Figure 8:
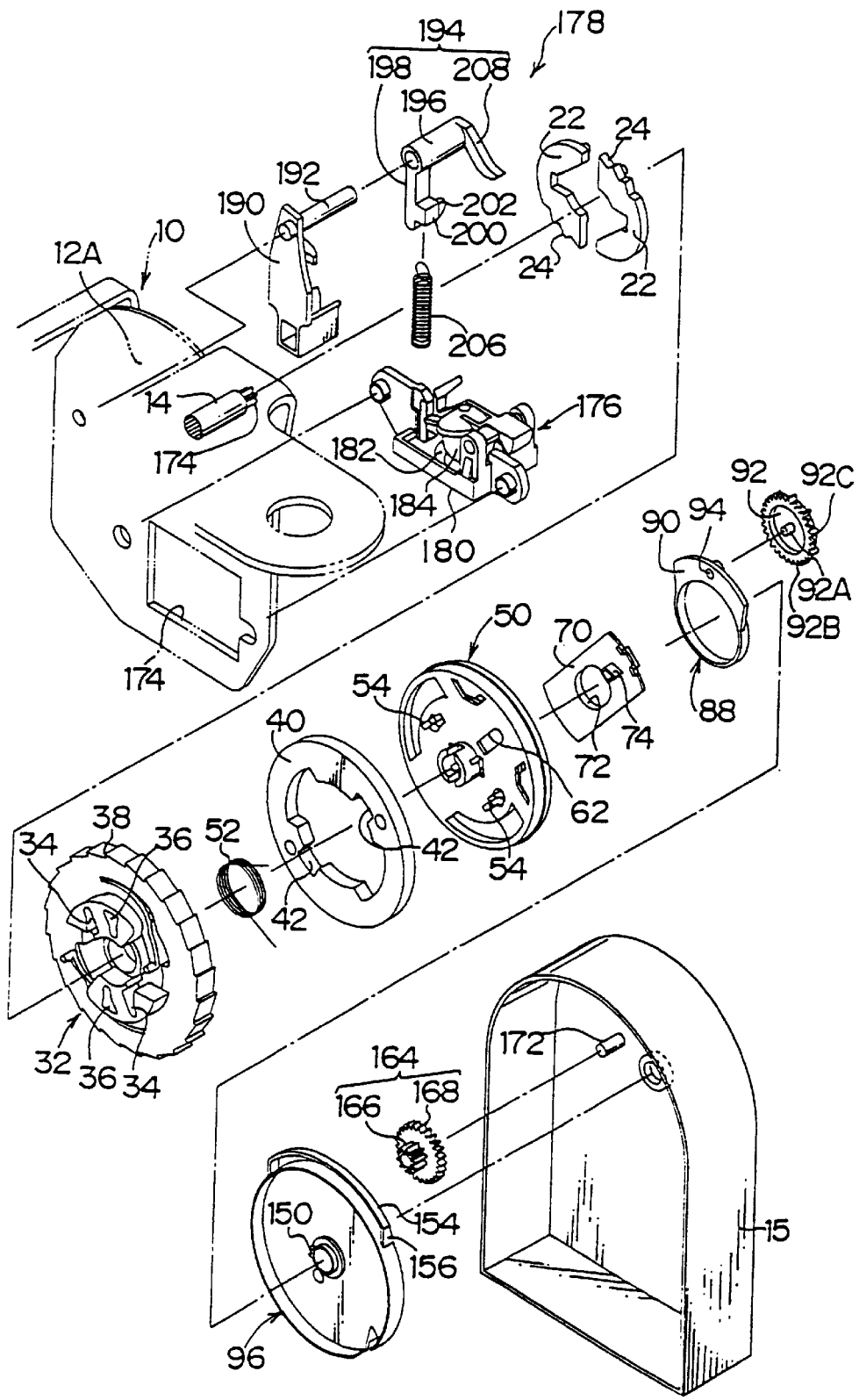
FIG. 8 is an exploded perspective view that illustrates the webbing take-up device relating to the present embodiment as seen from another side.

As shown in FIGS. 6, 7, and 8, in the webbing take-up device body 10, a frame 12 is fixed to a vehicle body through unillustrated mounting bolts. The frame 12 has a pair of leg portions 12A which respectively extend from two sides thereof parallel to each other. A cover side plate 15 which is shown in FIG. 7 is attached to the frame 12 at the near side of FIG. 6. A take-up shaft 14 is rotatably supported between these leg portions 12A of the frame 12. One end of a webbing 17 for restraining a vehicle occupant is engaged with this take-up shaft 14.

One end portion of the take-up shaft 14 in the lengthwise direction thereof protrudes outwardly from a leg portion 12A (i.e., the leg portion toward the left-hand of FIG. 6), and the internal end portion of a coil spring 18 is engaged with this protruding portion. The external end portion of the coil spring 18 is engaged with a spring cover 19 which accommodates therein the coil spring 18 which is fixed to the aforementioned leg portion 12A. Accordingly, due to the urging force from the coil spring 18, the take-up shaft 14 is energized and rotated in the direction in which the webbing is taken up (the direction of arrow D in FIG. 6), and the webbing 17 is taken up in a layered state.

Then, a vehicle occupant can adopt an applied webbing state by engaging a tang plate, which is not shown and which is mounted to an end portion of the webbing 17, with a buckle device mounted to the vehicle body.

As shown in FIGS. 6 to 13, the other end portion of the take-up shaft 14 protrudes outwardly from a leg portion 12A (the leg portion toward the right-hand of FIG. 6), and bifurcated portions 20 which extend from the take-up shaft 14 in a diametrical direction is formed at this protruding portion. A pair of lock plates 22, which form a part of lock means, are disposed between the bifurcated portions 20 and an end surface 14A of the take-up shaft 14.

Figure 12:
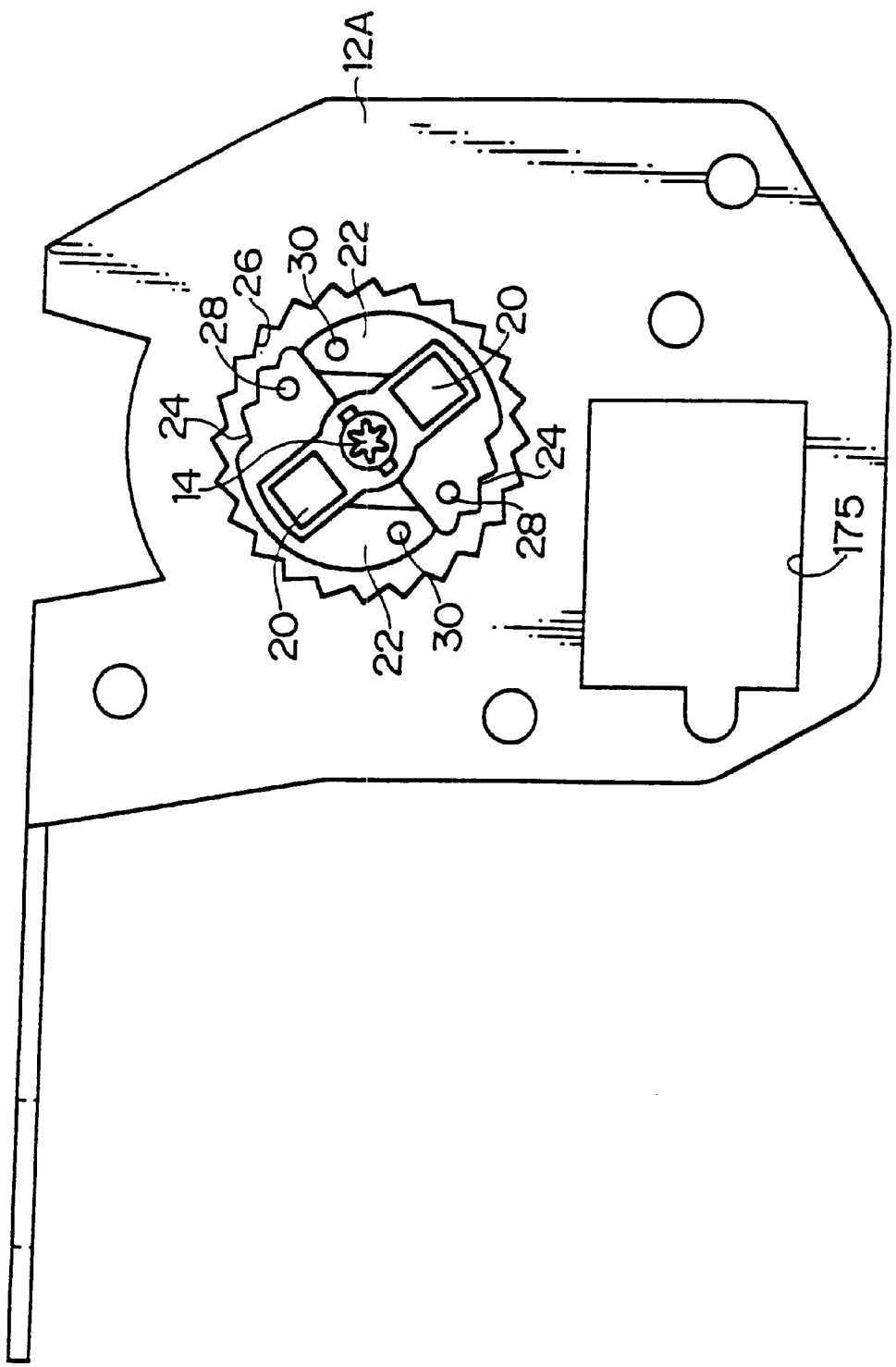
FIG. 12 is a front view that illustrates lock plates in an ordinary state of the webbing take-up device relating to the present embodiment.
Figure 13:
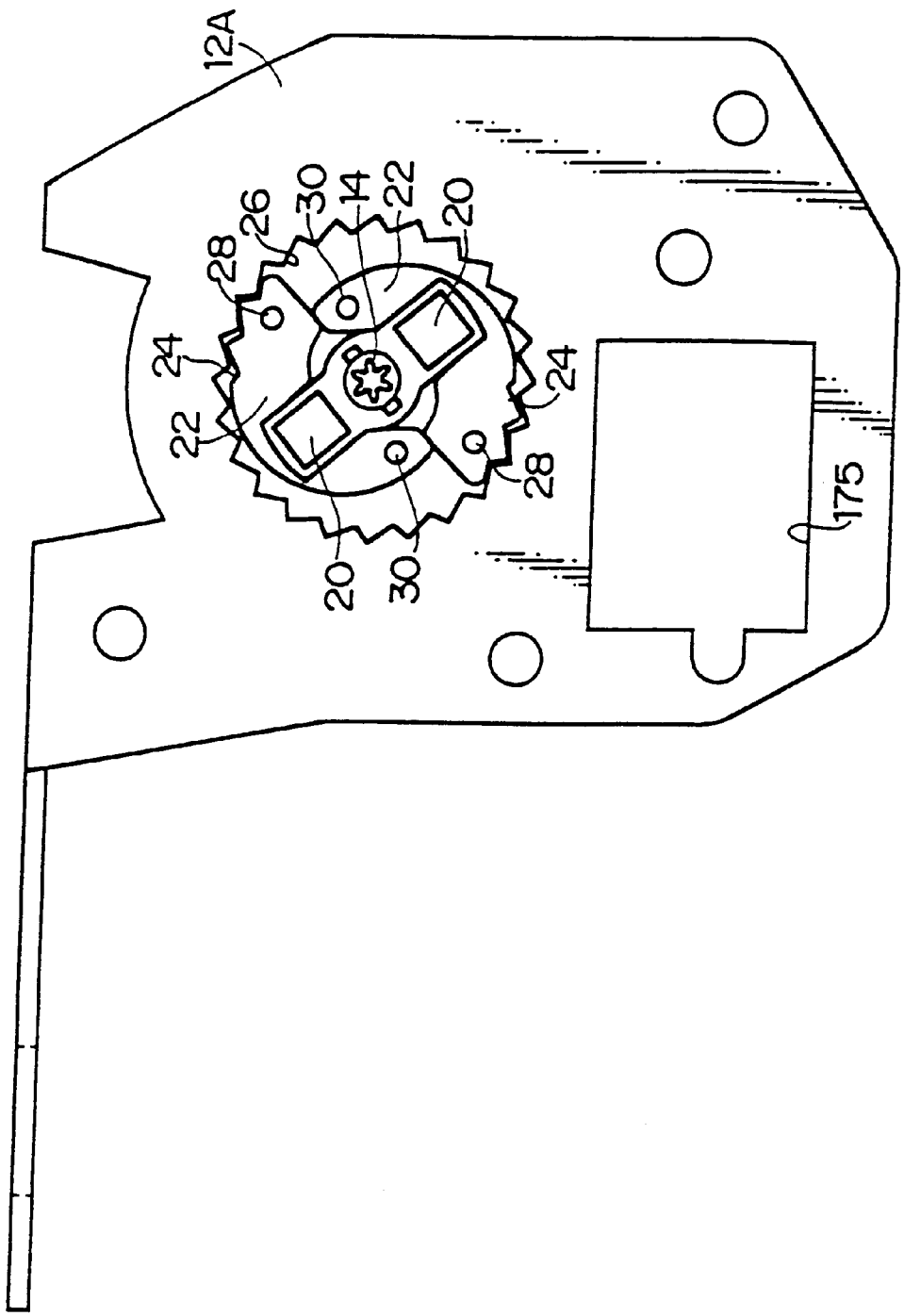
FIG. 13 is a front view of main portions of the lock plates in a locked state, in the webbing take-up device relating to the present embodiment.

Namely, each of the lock plates 22 is formed in a semi-circular arc shape. As shown in FIG. 12, in a state in which each of the intermediate portions of the lock plates 22 turns around the bifurcated portions 20, one side surface of each of the lock plates 22 abuts the end surface 14A having a large diameter, of the take-up shaft 14. Gaps are formed between inner circumferential portions of the lock plates 22, and the bifurcated portions 20, and the lock plates 22 and the take-up shaft 14 can move freely as is shown in FIG. 12 to FIG. 13.

Figure 9:
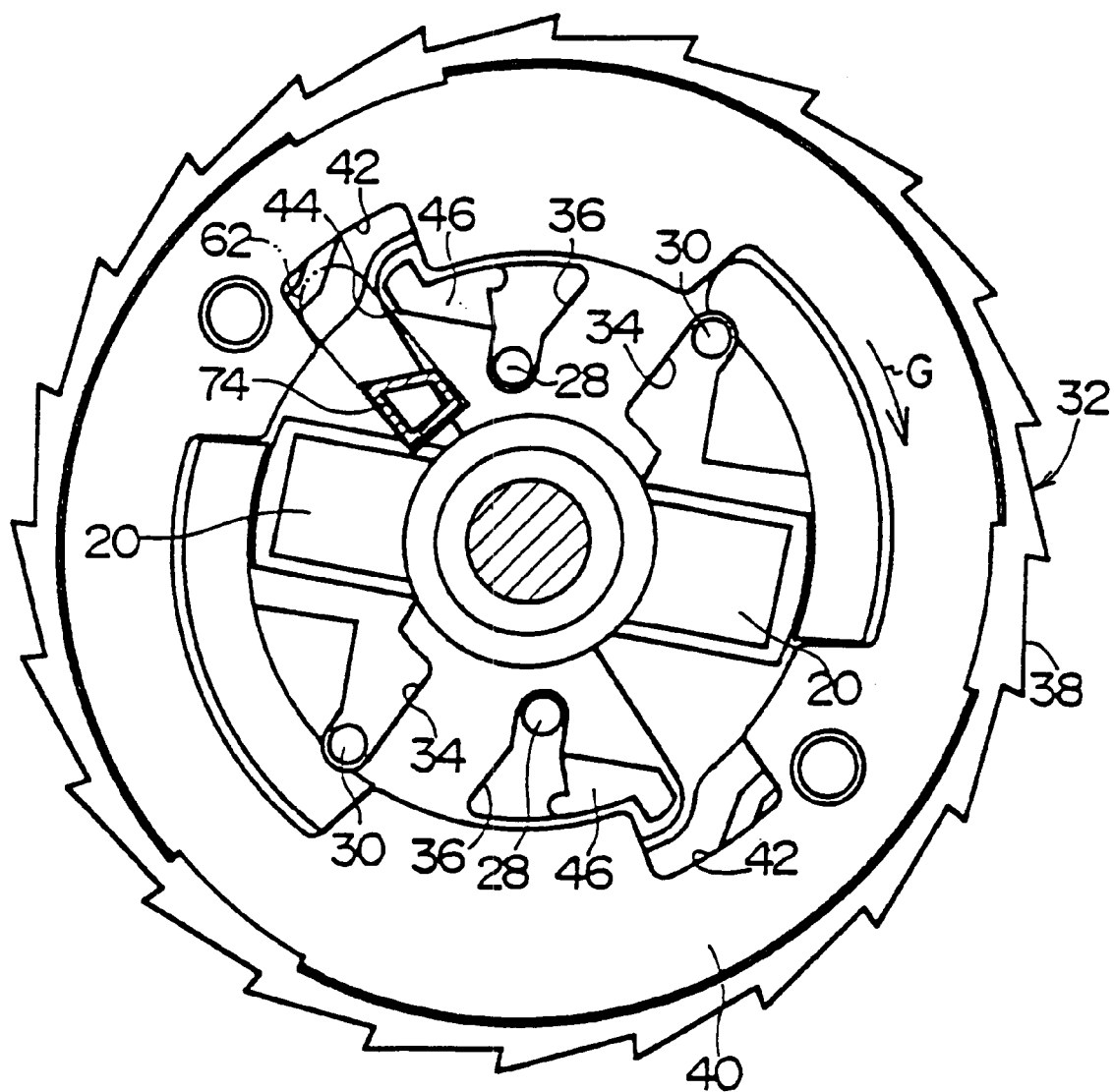
FIG. 9 is a plan view that illustrates main portions associated with a lock wheel in an ordinary state of the webbing take-up device relating to the present embodiment.
Figure 10:
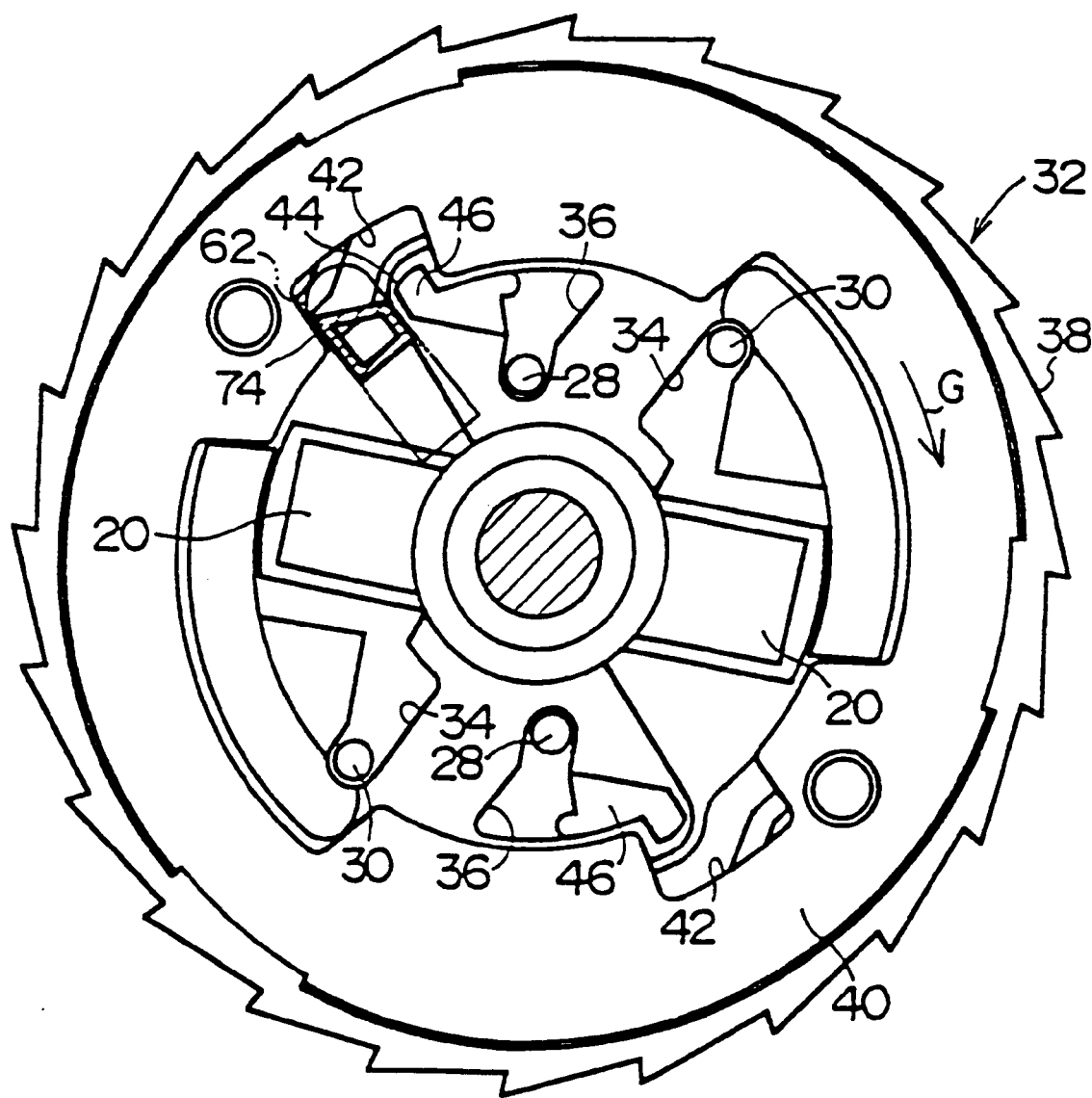
FIG. 10 is a plan view that illustrates the main portions associated with the lock wheel during an end lock preventing operation in the webbing take-up device relating to the present embodiment.
Figure 11:
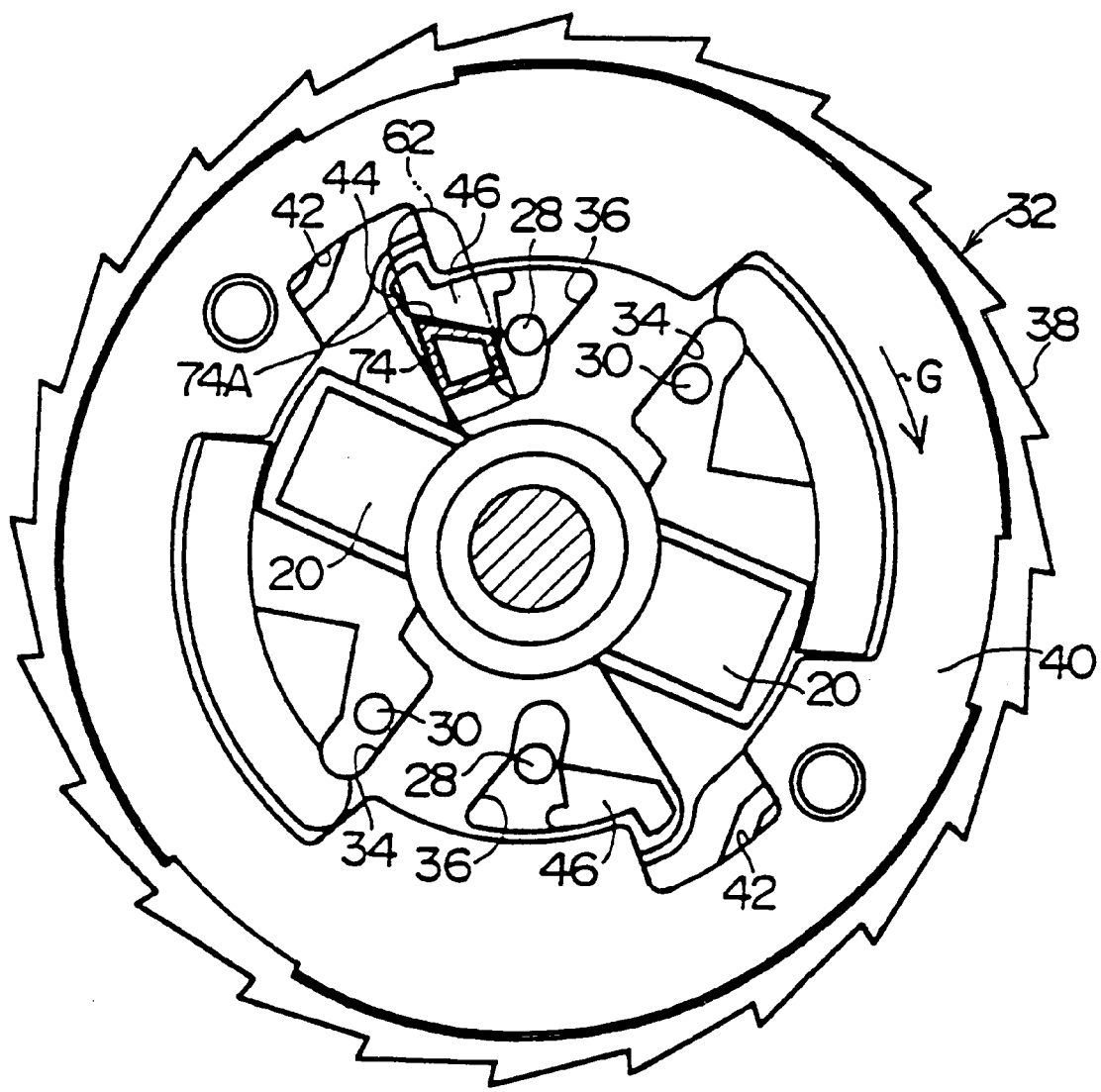
FIG. 11 is a plan view that illustrates the main portions associated with the lock wheel in a state in which the webbing take-up device relating to the present embodiment is locked.

A pawl portion 24 is formed at one end portion of each of these lock plates 22, and faces internal teeth of an internally toothed gear 26 which is fixed to the leg portion 12A, and which, together with the lock plates 22, forms a part of the lock means. Further, pairs of pins 28 and 30 are formed near the ends of each of the lock plates 22 so as to protrude therefrom. As shown in FIGS. 9 to 11, each of the pins 28 and 30 is inserted into corresponding guide holes 34 and 36 which are formed on a lock wheel 32. The lock wheel 32 is rotatably supported by the take-up shaft 14, and can rotate relatively with the take-up shaft 14 by a predetermined angle.

This lock wheel 32 is an externally toothed ratchet wheel having a large diameter, and ratchet teeth 38 are formed at an outer circumference thereof. As is shown in an exploded state in FIG. 8, a ring shaped inertia member 40 is attached to the inner side of the ratchet teeth 38, and is structured so as to apply an inertia force to the rotational motion of the lock wheel 32.

Further, insertion portions 42, each of which is formed as a U-shaped concave portion, are provided respectively at two portions of the inertia member 40 facing each other in the diametrical direction at the inner circumferential side thereof. Guiding curved surface portions 44, each of which is convex toward an opening provided at a predetermined position near an opening of each of these insertion portions 42, are formed at braking portions 46. Each of the braking portions 46 is integrally formed with the lock wheel 32, and thereby guide means are formed.

As shown in FIG. 6, a notched portion 48 for a detention engagement is cut out at a predetermined region that is closer to a tip end of the take-up shaft 14 than the lock wheel 32, which is rotatably supported by the take-up shaft 14. A rotor member 50, which is shown in FIGS. 7 and 8, is mounted at a notched portion 48 via a round hole portion 56. A pawl 56A, which protrudes inwardly at the round hole portion 56, is fitted into the notched portion 48, and is thereby engaged with the take-up shaft 14 so as not to be rotatable around the take-up shaft 14.

Further, a twisting coil spring 52 is disposed between the lock wheel 32 and the rotor member 50 by passing the take-up shaft 14 through a coil portion thereof. One end portion of this twisting coil spring 52 is engaged with one of engaging protruding portions 54 on a side surface of the rotor member 50 which is fixed to the take-up shaft 14, and the other end portion is engaged with one of the braking portions 46 of the lock wheel 32. Accordingly, the twisting coil spring 52 energizes the take-up shaft 14 to rotate continuously the lock wheel 32 in the direction indicated by arrow E (the direction in which the webbing is pulled out).

In this way, due to the urging force from the twisting coil spring 52, the lock wheel 32 is thereby rotated, and as shown in FIGS. 9 and 12, the pins 28 and 30 of the lock plates 22 are each pushed away to end portions of the corresponding guide holes 34 and 36, respectively. Each of the pawl portions 24 is separated from the internally toothed gear 26, and the take-up shaft 14 is set in a state shown in FIG. 12 in which the take-up shaft 14 can rotate freely in the direction in which the webbing 17 is pulled out (the direction of arrow E).

Further, in opposition to the urging force from the twisting coil spring 52, when the lock wheel 32 rotates relatively with the take-up shaft 14 and the rotor member 50 which are fixed integrally therewith (when rotational delay of the lock wheel 32 is caused), each of the pins 28 and 30 of the lock plates 22 enters a state in which they are moved to an intermediate portion of the corresponding guide holes 34 and 36, as shown in FIGS. 11 and 13. Each of the pawl portions 24 meshes with the internally toothed gear 26. The take-up shaft 14 is deterred from rotating in the direction in which the webbing 17 is pulled out (the direction of arrow E).

As shown in FIGS. 1 to 5, and 7, a ring-shaped second internally toothed gear 58 is formed integrally with the rotor member 50 in the vicinity of a peripheral portion of a disc portion 50A which is an opposite end surface of the lock wheel 32. A rectangular groove-shaped guide groove 60 which extends in a diametrical direction of the disc plate portion 50A is provided at the disc plate portion 50A. Further, a guide hole 62 which is a rectangular opening is formed from the round hole portion 56 to a peripheral portion in a diametrical direction of the disc plate portion 50A. A pair of guide shaft table portions 64 are formed at bilateral regions of the guide groove 60 in the disc plate portion 50A. Each of the guide shaft table portions 64 is formed in a table shape having a circular arc surface 64A so as to protrude from the disc plate portion 50A in the axial direction of the take-up shaft 14. The facing surfaces of the guide shaft table portions 64 are provided parallel to each other. The circular arc surfaces 64A of the guide shaft table portions 64 are formed so as to be concentric with the center of the round hole portion 56. Guiding circumferential table portions 66 are provided on flat surface portions of the disc plate portion 50A toward the inside of the second internally toothed gear 58. The guiding circumferential table portions 66, each of which is formed in a semi-circular arc table shape having an inner curved surface 66A, extend from bilateral side portions of the guide groove 60 at the side at which the guide hole 62 is not formed. Moreover, small guiding circumferential table portions 68, each of which is formed in a small protruding table shape having a curved surface 68A, are provided at the bilateral side portions of the guide groove 60 at the side at which the guide hole 62 is formed.

A slider 70 is mounted at the guide groove 60 of the disc plate portion 50A so as to slide freely in a diametrical direction of the disc plate portion 50A. An elongated hole 72 is formed at an intermediate portion of the slider 70. A tubular portion of the round hole portion 56 is inserted into this elongated hole 72. Accordingly, the slider 70 can move freely in the longitudinal direction thereof. Further, a boss portion 74 is provided so as to protrude from the slider 70 near the elongated hole 72 in a surface portion of the slider 70 that sliding-contacts the guide groove 60.

Figure 1:
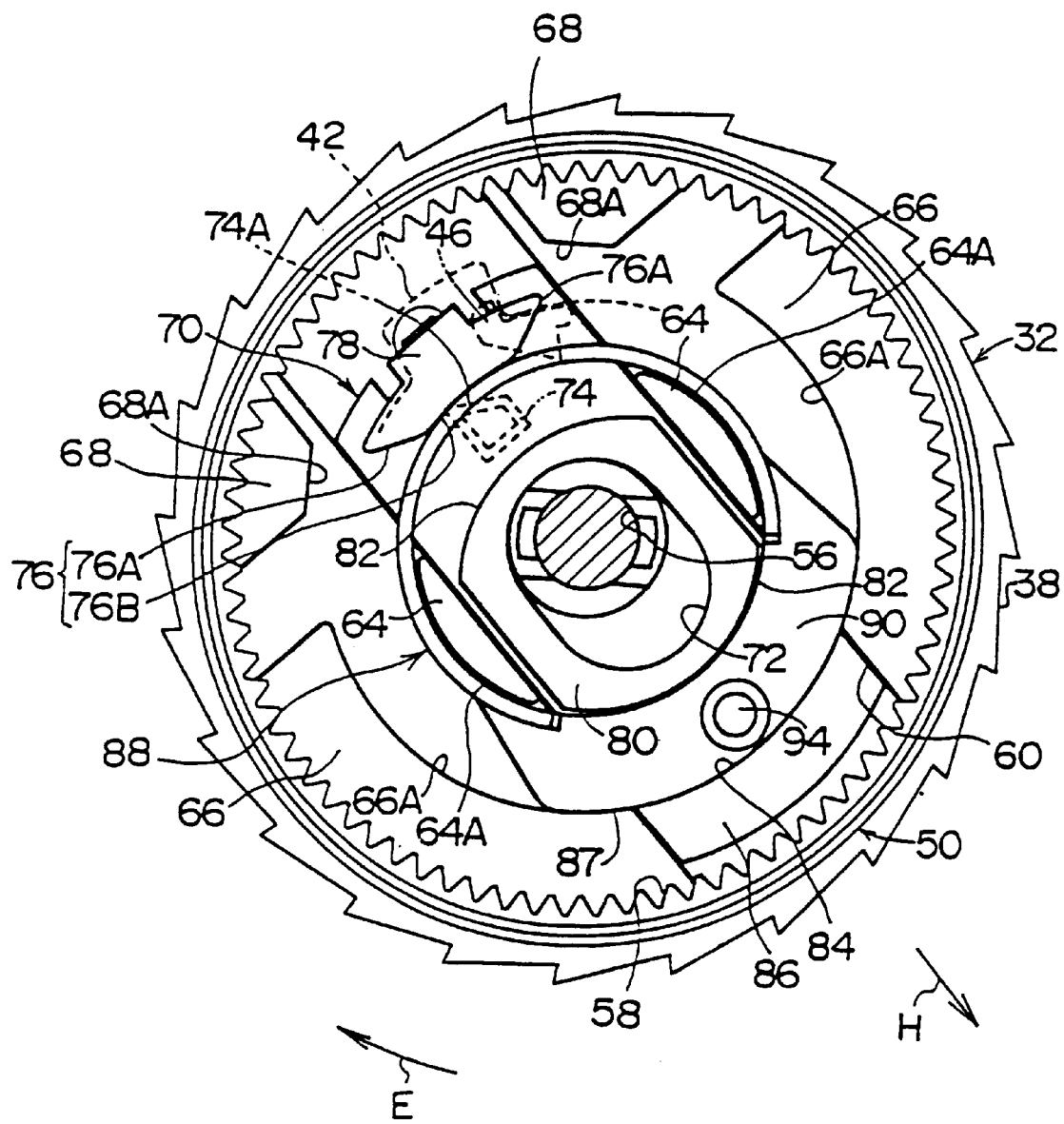
FIG. 1 is a schematic plan view that illustrates a state in which an entire amount of a webbing is pulled out, in main portions for structuring an end lock prevention mechanism of a webbing take-up device relating to an embodiment of the present invention.
Figure 2:
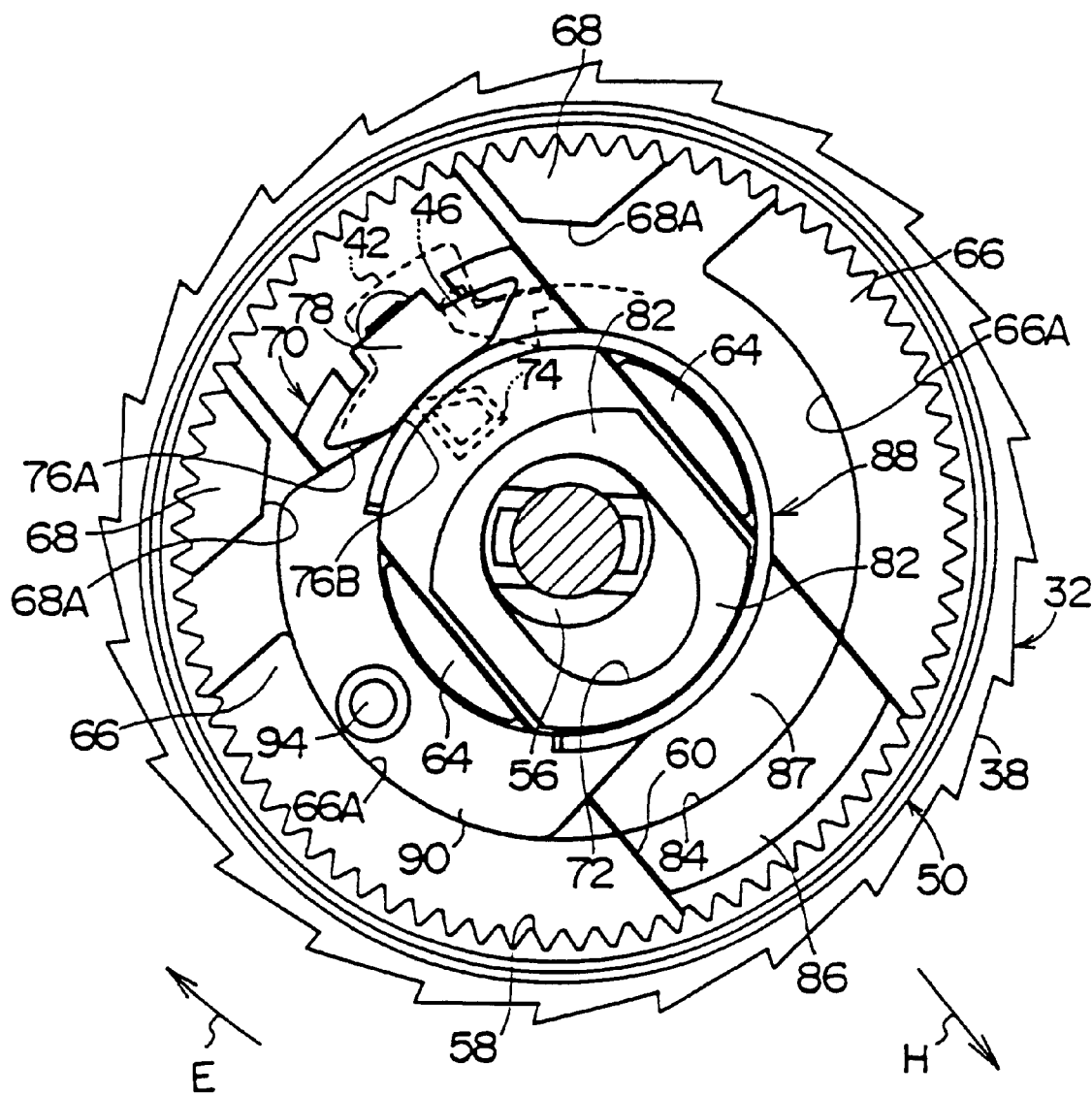
FIG. 2 is a schematic plan view that illustrates a state in which switching from ALR to ELR begins, in the main portions for structuring the end lock prevention mechanism of the webbing take-up device relating to the present embodiment.

As is shown also in FIG. 1, this boss portion 74 is formed in a tubular shape whose plane is formed in a trapezoidal shape. A side surface portion 74A, which inclines from a peripheral side in a diametrical direction of the rotor member 50 toward the center thereof (an inclination toward the lower right in FIG. 1), is formed on a side surface of the boss portion 74 outwardly in a diametrical direction of the slider 70, toward the corresponding braking member 46 of the lock wheel. Further, in a state in which the boss portion 74 is inserted into the guide hole 62, the boss portion 74 is guided by the side portions thereof, and slides therebetween.

A table-shaped following portion 78 having a following surface 76 is provided so as to protrude from a flat free end portion at a side of the slider 70 opposite to the side of the slider 70 at which the boss portion 74 is formed. This following portion 78 is formed into an equilateral trapezoidal frame shape whose short base sides face the elongated hole 72. The following surface 76 of the following portion 78 is formed by slope surface portions 76A which incline from both ends of the following portion 78 toward the elongated hole 72, and a circular arc surface portion 76B, which connects these slope surface portions and which is concentric with the center of the elongated hole 72.

An elongated annular table-shaped inner circumferential guide table portion 80 is provided at an outer circumferential portion of the elongated hole 72 on a side surface portion of the slider 70 having the following portion 78. Both circumferential portions of the inner circumferential guide table portion 80 in the lengthwise direction of the slider 70 are formed as inner circumferential guide surfaces 82. The inner circumferential guide surfaces 82 facing each other are formed on circular arc surfaces having the same curvature as the circular arc surfaces 64A of the guide shaft table portions 64. The inner circumferential guide surfaces 82 are disposed in an eccentric state in which the distance of the radius of each of the inner circumferential guide surfaces 82 is made longer than the distance from the center of the elongated hole 72 to each of the inner circumferential guide surfaces 82.

A circular arc table-shaped outer circumferential guide portion 86 having an outer circumferential guide surface 84 is provided at an end portion opposite to the following portion 78 of the slider 70. The outer circumferential guide surface 84 is formed on a circular arc surface which faces the elongated hole 72 side, and which is concentric with and parallel to one of the inner circumferential guide surfaces 82 which faces this outer circumferential guide surface 84. A guide path 87 having a constant width is formed between the inner circumferential guide surface 82 and the peripheral guide surface 84.

An annular cam plate 88 is disposed between the pair of the guide shaft table portions 64 of the rotor member 50, and the inner circumferential guide table portion 80. The cam plate 88 operates as an arm member of a planet gear mechanism shown in Fig. 5. As shown in FIGS. 1 to 8, a portion of the ring portion of this cam plate 88 has a width slightly smaller than that of the guide path 87, and is formed as a circular arc thick plate shaped cam plate portion 90 which spreads fully within the guide path 87 and slides therein. A shaft hole 94 into which a shaft bar 92A of a planet gear 92 is inserted is formed at a central portion of this cam plate portion 90.

The planet gear 92 is formed with a full-teeth gear portion 92B and a missing-teeth gear portion 92C integrally overlapping each other in the tooth thickness direction thereof. At least the full-teeth gear portion 92B of the planet gear 92 meshes with the second internally toothed gear 58.

As shown in FIGS. 5 to 8, and FIGS. 14 to 16, an ALR cam member 96 is supported so as to be freely rotatable at a side that is closer to the free end of the take-up shaft 14 than the rotor member 50. A shaft cylindrical portion 98 (FIG. 7) which is formed in a cylindrical shape to receive a shaft is provided at the center of this ALR cam member 96. A third intermediate gear 150 (FIG. 8) is provided at a surface portion of the shaft cylindrical portion 98 toward the planet gear 92. The third intermediate gear 150 is formed as a missing-teeth gear portion in which two teeth are provided successively, and is able to mesh with the missing-teeth gear portion 92C.

A first internally toothed gear 152 is provided at an inner circumferential surface portion of a cylindrical portion concentric with the rotational axis of the ALR cam member 96 and having a small diameter, of a flat surface portion at the cover side portion 15 side of the ALR cam member 96. Further, a braking portion 154 for an acceleration sensor is formed such that a predetermined region of an outermost periphery arc portion of the ALR cam member 96 is formed in a circular arc shape so as to be concentric with the ALR cam member 96 and to protrude therefrom. Further, transition portions 156 with an oblique side form, which each extends from an outermost periphery arc portion of the ALR cam member 96 to a peripheral portion of the braking portion 154 in a smooth manner, are respectively formed at end portions of this braking portion 154.

Figure 14:
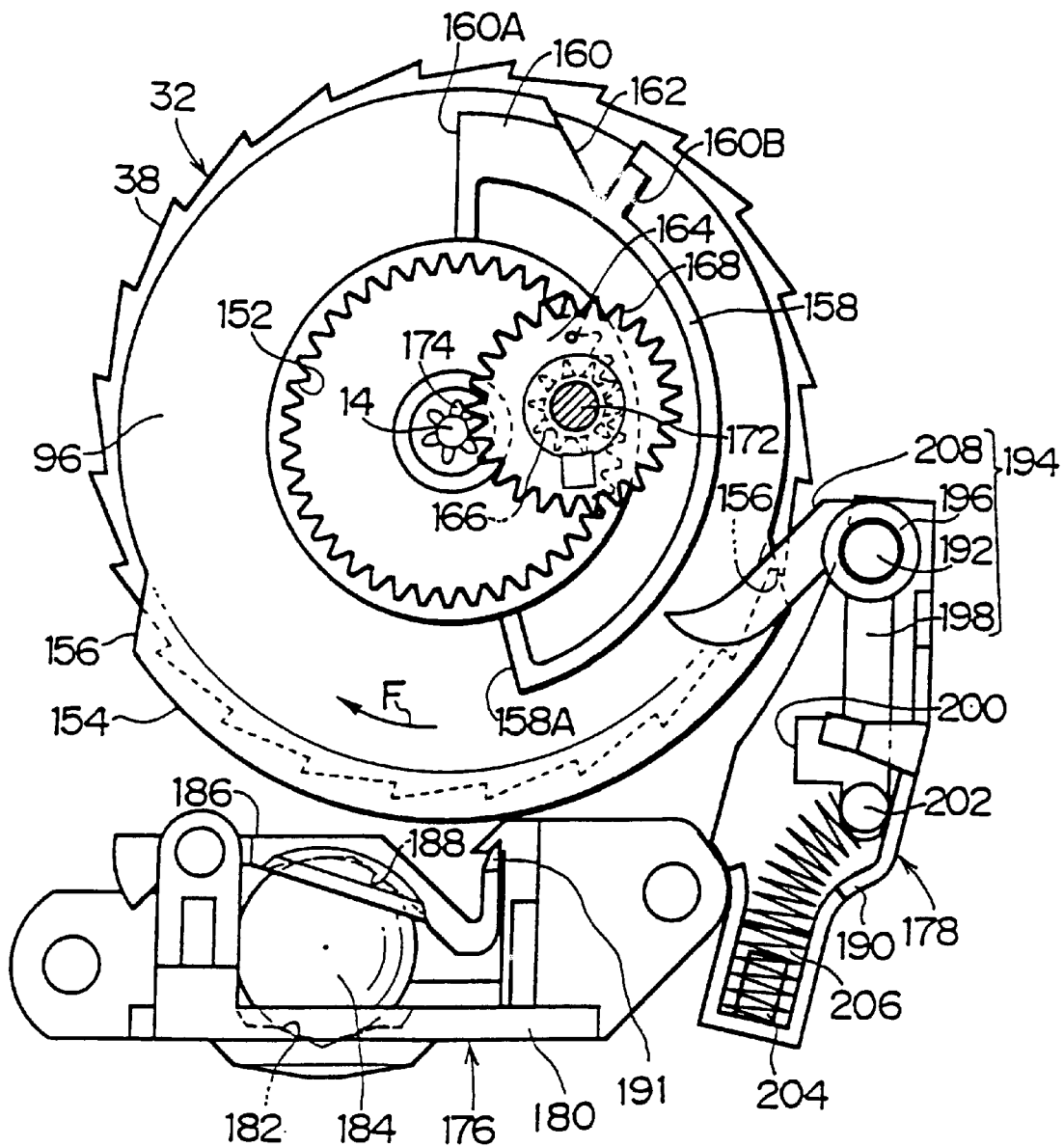
FIG. 14 is a plan view that illustrates main portions of a switching mechanism of ALR and ELR in a state in which the entire amount of the webbing is taken up in the webbing take-up device relating to the present embodiment.

Further, as shown in FIG. 14, an operation portion 158 for an ALR-ELR switching mechanism is formed at a predetermined region of a peripheral portion of the first internally toothed gear 152 of the ALR cam member 96. The operating portion 158 is formed to have a circular arc-shaped plane and a frame shape. An operation table portion 160 is formed integrally at one end portion of this operation portion 158, and the other end portion is made as an operation end surface 158A. This operation table portion 160 is formed in an almost small circular arc shape, and has operation end surfaces 160A and 160B at the two end portions thereof, respectively. A V-shaped assembly auxiliary groove 162 is formed near the operation end surface 160B of the operation table portion 160.

Figure 5:
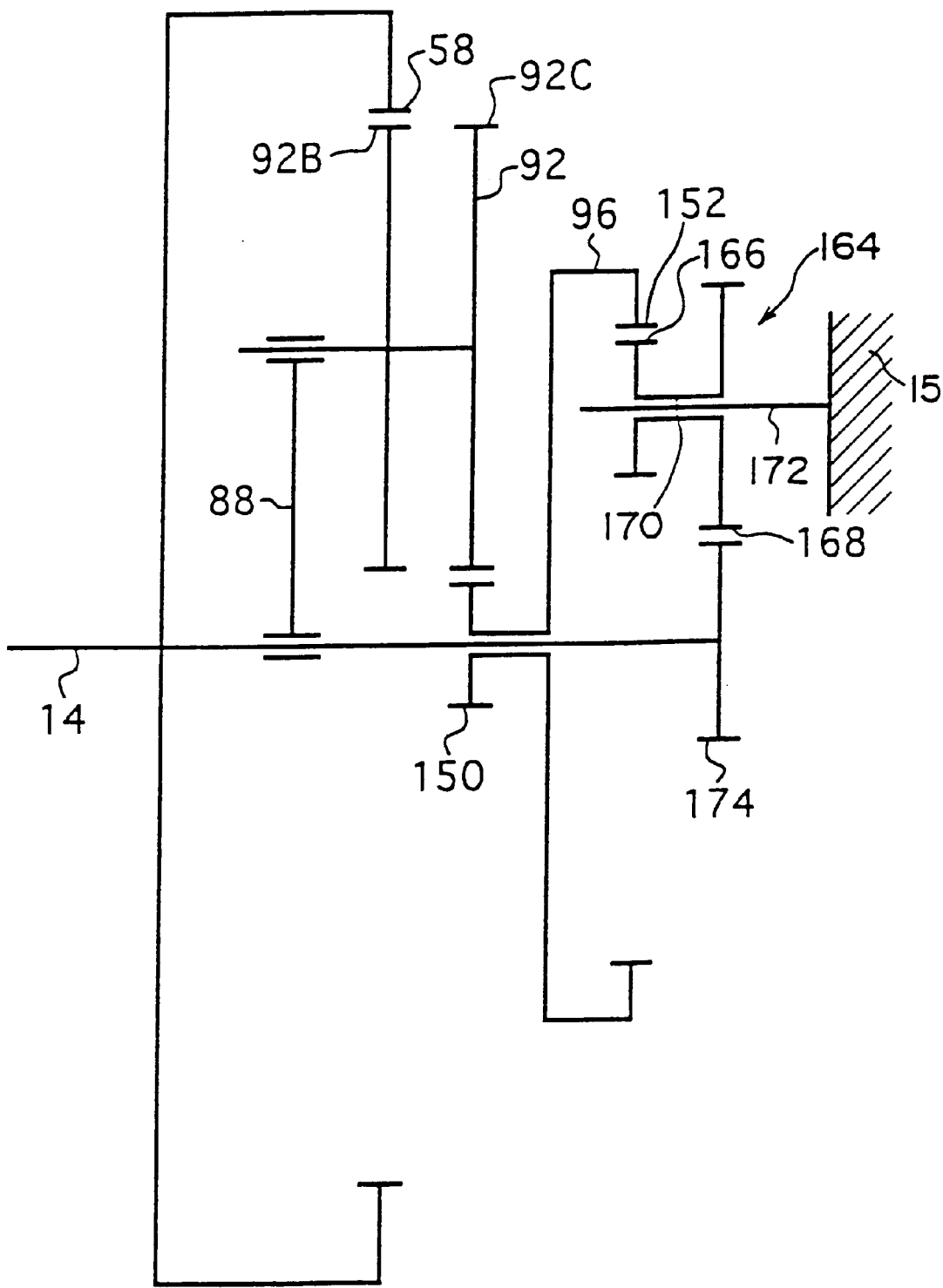
FIG. 5 is a schematic explanation view that illustrates a gear mechanism using a planet gear in the webbing take-up device relating to the present embodiment.

As is also shown in FIG. 5, a second intermediate tooth portion 166 of an intermediate gear member 164 meshes with the first internally toothed gear 152 of the ALR cam member 96. The intermediate gear member 164 comprises a second intermediate tooth portion 166 which has few teeth and a small diameter, and a first intermediate tooth portion 168 which has many teeth and a large diameter. The second intermediate tooth portion 166 and the first intermediate tooth portion 168 are formed coaxially and integrally with each other. A shaft hole 170 is formed along an axis core of the intermediate gear member 164. The intermediate gear member 164 is disposed by a shaft pin 172 which protrudes from a predetermined position at an inner side surface of the cover side portion 15 being inserted into the shaft hole 170.

This first intermediate tooth portion 168 meshes with a driving gear 174 which is formed integrally with the free end portion of the take-up shaft 14.

As shown in FIGS. 6, 7 and 8, and FIGS. 14 to 16, an acceleration sensor 176 is mounted to a rectangular opening portion 174 which is formed on the frame 12 of the webbing take-up device body 10. Further, the ALR-ELR switching mechanism 178 is mounted to the frame 12 adjacent to the acceleration sensor 176. In this acceleration sensor 176, a metallic spherical body 184 is placed in a dish-shaped concave portion 182 which is disposed in the horizontal direction of a pedestal portion 180 thereof. When an acceleration greater than or equal to a predetermined value containing a component in the horizontal direction is applied to the spherical body 184, the spherical body 184 rolls between slopes of the concave portion 182 and the concave portion 188, rotates the pawl portion 186 around a shaft supporting portion thereof, engages an engaging pawl 191, which is provided at a free end of the pawl portion 186, with the ratchet teeth 38 of the lock wheel 32, and thereby deters the ratchet teeth 38 from rotating in the direction of arrow F (the direction in which the webbing is pulled out).

Further, in the ALR-ELR switching mechanism 178, a round shaft bar 192 which is formed upright at a supporting housing 190 is inserted into a shaft cylindrical portion 196 of an operating member 194. A braking arm portion 198 is formed so as to protrude from a portion in the vicinity of one end portion of this shaft cylindrical portion 196. An engaging portion 200 as a rectangular projecting portion is formed so as to be integrated with a portion in the vicinity of a free end of this arm portion 198. The engaging portion 200 engages with the ratchet teeth 38 so as to deter the ratchet teeth 38 from rotating in the direction of arrow F. Further, an engaging pin 202 which extends parallel to the axial line of the shaft cylindrical portion 196 is formed upright at a free end portion of the arm portion 198. A compression coil spring 206 is laid between this engaging pin 202 and a projecting pin 204 of the supporting housing 190. The operating member 194 carries out a snap action movement. Namely, the operating member 194 is energized to a position shown in FIG. 14 in which the engaging portion 200 disengages from the ratchet teeth 38, and to a position shown in FIG. 16 in which the engaging portion 200 engages with the ratchet teeth 38, with an intermediate point between the above-described positions as a fulcrum, in directions opposite to each other,.

Further, an arm portion to be moved 208 is formed so as to protrude from a portion near the other end portion of the shaft cylindrical portion 196 of the operating member 194 so as to face the operating table portion 160. This arm portion to be moved 208 and the braking arm portion 198 are disposed so as to protrude in different directions from each other, to form a V-shaped plane. Moreover, the arm portion to be moved 208 is curved from one end portion to the free end portion thereof, and is curved toward the opposite side of the braking arm portion 198.

Figure 15:
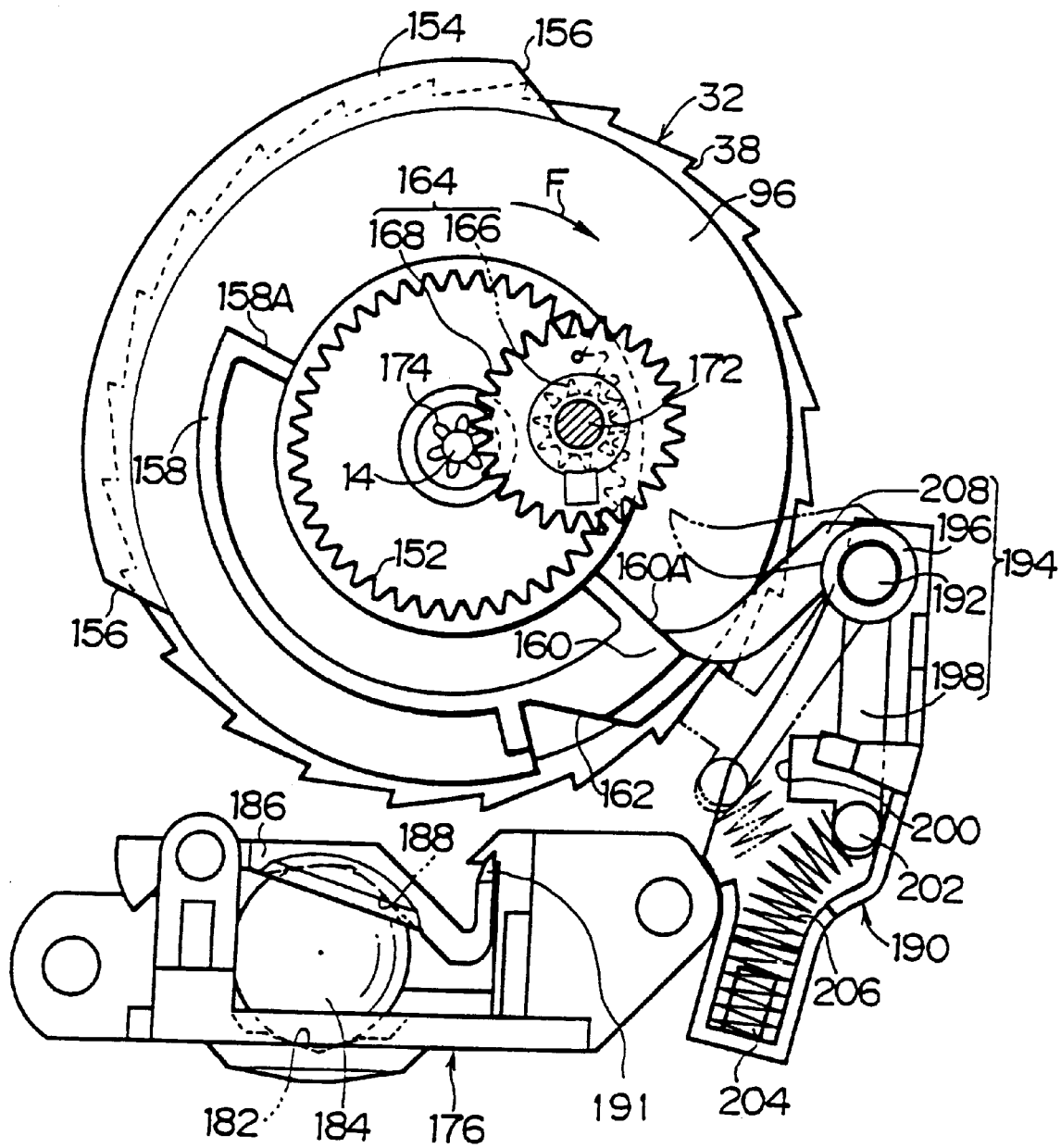
FIG. 15 is a plan view that illustrates the main portions of the switching mechanism of ALR and ELR in a state in which switching of ALR and ELR begins in the webbing take-up device relating to the present embodiment.

Then, in a state shown in FIGS. 14 and 15 in which the engaging portion 200 is disengaged from the ratchet teeth 38, due to a movement of the ALR cam member 96 which rotates in the direction opposite to arrow F, the operating end surface 160A presses the arm portion to be moved 208, and rotates this from a position shown by a solid line to a position shown by a double-dashed chain line, in FIG. 15. Accordingly, as shown by a solid line in FIG. 16, the engaging portion 200 is set in a state in which it engages with the ratchet teeth 38.

Figure 16:
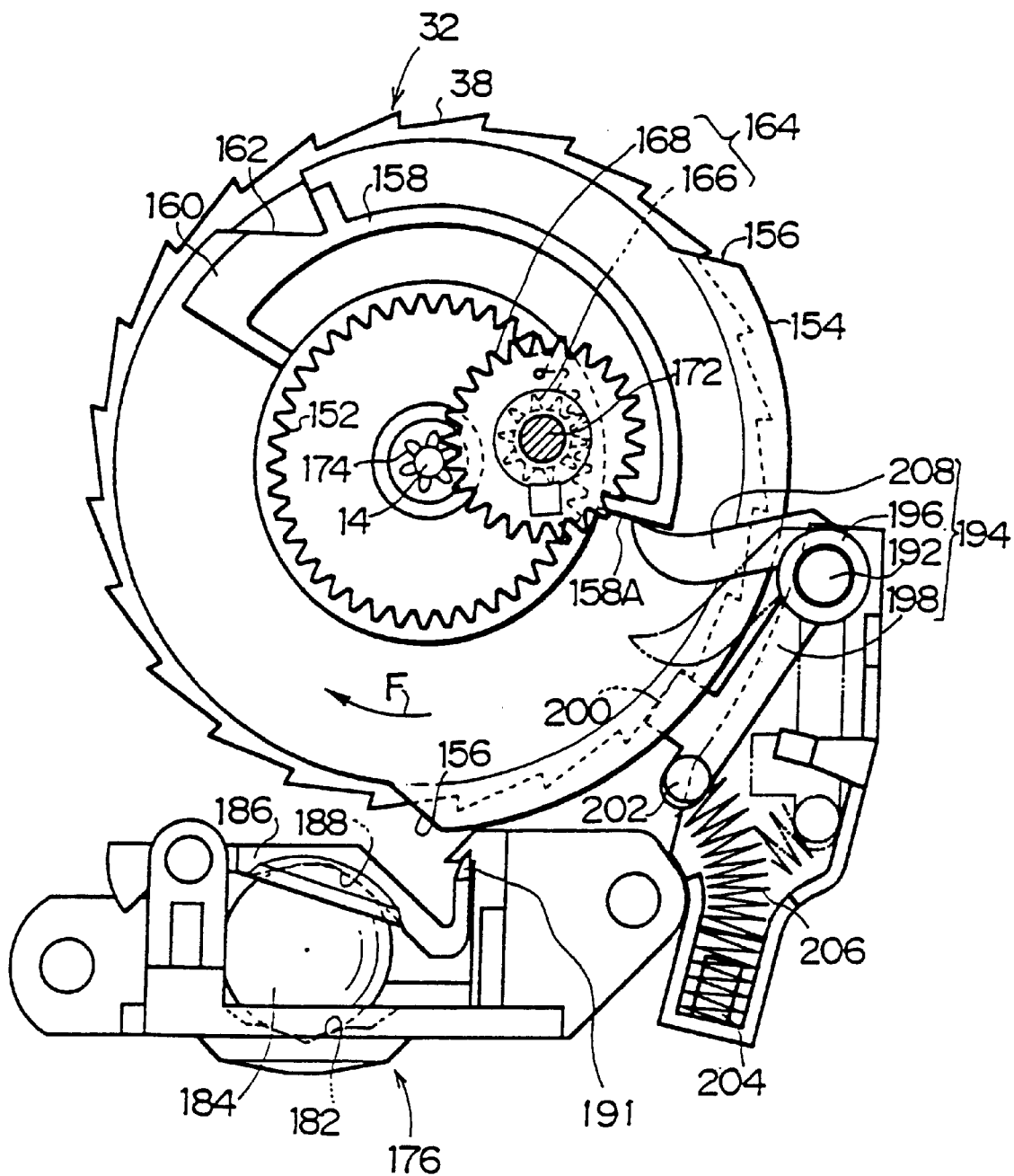
FIG. 16 is a plan view that illustrates the main portions of the switching mechanism of ALR and ELR in a state just before ALR and ELR are switched in the webbing take-up device relating to the present embodiment.
Figure 17:
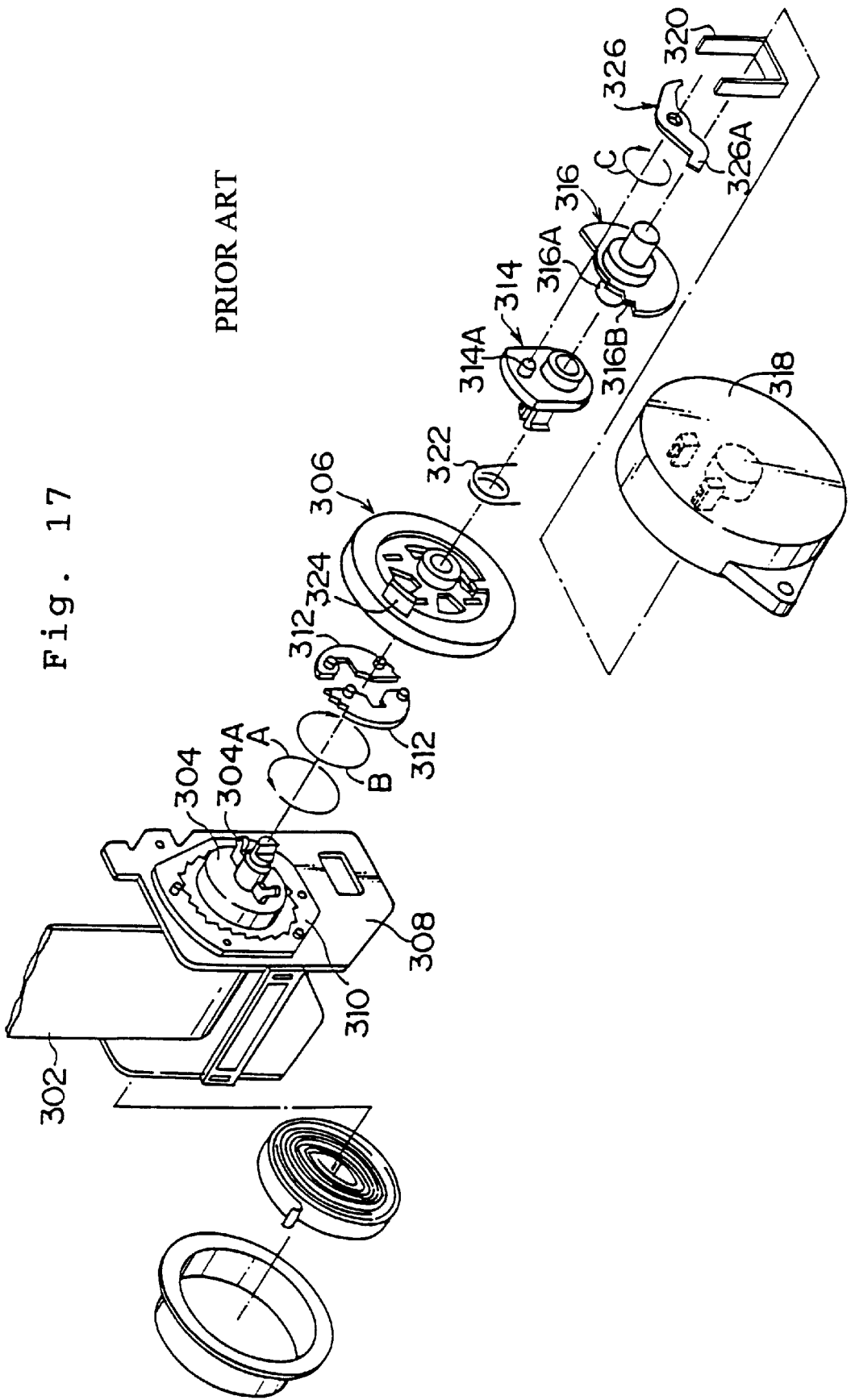
FIG. 17 is an exploded perspective view that illustrates main portions of a conventional webbing take-up device.

From this state which is shown by a solid line in FIG. 16, due to a movement in which the ALR cam member 96 rotates in the direction of arrow F, the operating end surface 158A presses the arm portion to be moved 208, and rotates this from a position shown by a solid line to a position shown by a double-dashed chain line, in FIG. 16. Accordingly, as is shown by a solid line in FIGS. 14 and 15, the engaging portion 200 is set in a state in which it is disengaged from the ratchet teeth 38.

A method of using the webbing take-up device according to the present embodiment having the above-described structure, and an operation thereof will be described hereinafter.

In a state before the webbing 17 is applied to a vehicle occupant, due to the urging force from the coil spring 18, the entire amount of the webbing 17 is taken up by the take-up shaft 14. In this state, as is also shown in FIG. 14, the braking portion 154 of the ALR cam member 96 does not allow the engaging portion 200 of the braking arm portion 198 to be engaged with the ratchet teeth 38 of the lock wheel 32. Namely, in this state, the webbing take-up device body 10 is in a mode of use for ELR.

From this state, in order for the vehicle occupant to apply the webbing 17, the unillustrated tang plate should be grasped and the webbing 17 is pulled out by resisting the urging force from the coil spring 18. By engaging the tang plate with the buckle device, the vehicle occupant attains an applied webbing state and can change his or her driving style freely.

On the other hand, at the time of a rapid deceleration of a vehicle, the spherical body 184 carries out an inertia movement, rotates the pawl portion 186 around a shaft pin, and thereby engages the engaging pawl 191 with the ratchet teeth 38. For this reason, the lock wheel 32 is prevented from rotating in the direction in which the webbing 17 is pulled out.

At this time, because the vehicle occupant also carries out an inertia movement, the webbing is pulled out from the take-up shaft 14, the take-up shaft 14 rotates in the direction in which the webbing is pulled out, and, thus generating rotation of the take-up shaft 14 relative with the lock wheel 32 in the direction of arrow G and changing from the state in FIG. 9 to the state in FIG. 11. Due to this relative rotation, the lock plates 22, which rotate together with the take-up shaft 14, move by the pins 28 and 30, of the lock plates 22, being guided by the guide holes 34 and 36 of the lock wheel 32. The pawl portions 24 mesh with the lock teeth of the internally toothed gear 26, and the take-up shaft 14 is prevented from rotating in the direction in which the webbing is pulled out (the direction of arrow E). As a result, the vehicle occupant is reliably restrained by the webbing 17. In this state, as shown in FIG. 11, since the boss portion 74 and the braking members 46 are separated from each other in a diametrical direction of the lock wheel 32, even when the lock wheel 32 rotates relatively with the take-up shaft 14, the boss portion 74 and the braking members 46 do not interfere with each other.

In the aforementioned attached webbing state of the vehicle occupant, as shown in FIG. 14, the engaging portion 200 of the braking arm portion 198 does not engage with the ratchet teeth 38 of the lock wheel 32.

The operation and movement of webbing sensitive type lock means will be described hereinafter. This means operates when the webbing 17 is pulled out rapidly. Namely, when the webbing 17 is pulled out rapidly, the rotor member 50 rotates together with the take-up shaft 14. However, since the lock wheel 32 contains the inertia member 40 having a large mass, it attempts to maintain a stopped state. For this reason, by resisting the urging force from the twisting coil spring 52 which is laid between the lock wheel 32 and the rotor member 50, the rotation of the lock wheel 32 is delayed, and the lock wheel 32 thereby rotates later than the rotor member 50. As described above, the lock wheel 32 and the rotor member 50 rotate relatively with each other in the direction indicated by arrow G in FIG. 12. Accordingly, as shown in FIG. 13, the webbing 17 is prevented from being pulled out.

The webbing take-up device 10 according to the present embodiment can be switched to a mode of use for ALR as needed (for example, when a child seat or the like is fastened to a passenger seat). Almost the entire amount of the webbing is pulled out, and a switching operation is carried out.

In the state shown in FIG. 14, when the webbing 17 is pulled out from the take-up shaft 14, the driving gear 174, the first intermediate gear 168, the second intermediate gear 166, and the first internally toothed gear 152 move in response to each other so as to rotate the ALR cam member 96 in the direction opposite to arrow F as shown in FIG. 15.

As shown in FIG. 15, the webbing 17 is set in a state just before the entire amount thereof is pulled out. Further, in this state, when the webbing 17 is pulled out, the ALR cam member 96 rotates in the direction opposite to arrow F. The operating end surface 160A of the ALR cam member 96 rotates the arm portion to be moved 208 of the operating member 194 from the position shown by a solid line to the position shown by a double-dashed chain line. Then, the braking arm portion 198 of the operating member 194 is also rotated to a position shown by the double-dashed chain line. The engaging portion 200 of the operating member 194 meshes with the ratchet teeth 38, and prevents the lock wheel 32 from rotating in the direction of arrow E. In addition, the ratchet teeth 38 mesh with the engaging portion 200 only when the lock wheel 32 rotates in the direction of arrow F. When the lock wheel 32 rotates in the direction opposite to arrow F, the ratchet teeth 38 are provided with a so-called one way clutch function in which the ratchet teeth 38 and the engaging portion 200 slide with each other. Even in this state, the lock wheel 32 can freely rotate in the direction opposite to arrow F (the direction in which the webbing 17 is taken up). As a result, the lock wheel 32 is prevented from rotating in the direction in which the webbing 17 is pulled out (the direction of arrow F). Namely, the mode of use of the webbing take-up device 10 is switched from ELR to ALR.

In a state in which the webbing take-up device 10 is switched to ALR, as described above, the take-up shaft 14 is prevented from rotating in the direction in which the webbing 17 is pulled out; however, the take-up shaft 14 can freely rotate in the direction in which the webbing is taken up. For this reason, after an operation in which the child seat or the like is fastened to a vehicle seat by the webbing 17 has been completed, the remaining webbing 17 is taken up due to the urging force of the power coil 18, and the child seat or the like can reliably be fastened to the vehicle seat.

When the webbing take-up device 10 is switched from ALR to ELR, if a required amount of the webbing is taken up, the operating member 194 is operated by the operating end surface 158A, and the engaging portion 200 disengages from the ratchet surface 38. Accordingly, the webbing take-up device 10 is switched from ALR to ELR.

Next, an operation and movement of an end lock prevention mechanism with which the webbing take-up device body 10 according to the present embodiment is equipped will be explained hereinafter. As described above, in order to switch from ELR to ALR, when the entire amount of the webbing is pulled out, the ALR cam member 96 rotates due to the movement of the gear mechanism shown in FIG. 5. The third intermediate gear 150 as a missing-teeth gear is provided at this ALR cam member 96. The third intermediate gear 150 intermittently meshes with and interlocks with the missing-teeth gear portion 92C of the planet gear 92, and transmits reduction. Further, in conjunction with this, the second internally toothed gear 58 rotates in accordance with the rotation of the take-up shaft 14, and the planet gear 92 meshing with this second internally toothed gear 58 also rotates. Then, this planet gear 92 is reduced so as to rotate the cam plate 88, which forms an arm portion of the planet gear mechanism, by an amount corresponding to the difference between the rotations of the second internally toothed gear 58 and the third intermediate gear 150, in a large reduction ratio. As shown in FIG. 1, the cam plate member 90 presses the peripheral guide table portion 86 in a direction opposite to the following portion 78, and an end lock cancellation state (an end lock permission state) in which the boss portion 74 is removed from the insertion portion 42 is set.

In the end lock cancellation state which is shown in FIG. 1, the state is adopted in such a manner that the cam plate portion 90 of the cam plate 88 presses the peripheral table portion 86 in the direction of arrow H, and presses the slider 70 in the direction of arrow H as shown in this figure. The boss portion 74 of the slider 70 is removed from the gap between the insertion portion 42 and the braking member 46. Accordingly, a state is adopted in which the lock wheel 32 can rotate relatively with the rotor member 50 integrated with the take-up shaft 14 at a required angle, opposing the urging force from the twisting coil spring 52.

In this state, as shown in FIG. 16, since the engaging portion 200 meshes with the ratchet teeth 38, when the webbing 17 is pulled out, the rotor member 50 rotates relatively with the take-up shaft 14 in the direction of arrow E. The state changes from a state shown in FIGS. 9 and 12 corresponding to FIG. 1 to a state shown in FIGS. 11 and 13. Namely, as described above, the pawl portions 24 of the lock plates 22 engage with the internally toothed gear 26 so as to prevent the webbing 17 from being pulled out further.

Next, in the state shown in FIG. 1 in which the entire amount of the webbing 17 has been pulled out, when a predetermined amount which is almost the entire amount of the webbing 17 is taken up by the take-up shaft 14, the ALR cam member 96 of FIG. 16 rotates in the direction of arrow F, and the operating end surface 158A presses the arm portion to be moved 208. Accordingly, the operating member 194 rotates inversely to a state shown by the solid line in FIG. 14, and a switch is made to ELR. At an initial stage of the switch to ELR, in the gear mechanism shown in FIG. 5, the cam plate 88 rotates to a state shown in FIG. 2. The cam plate portion 90 slides on the slope surface portion 76B of the following surface 76, presses the following portion 78, and starts to press the slider 70 in the direction opposite to arrow H.

Figure 3:
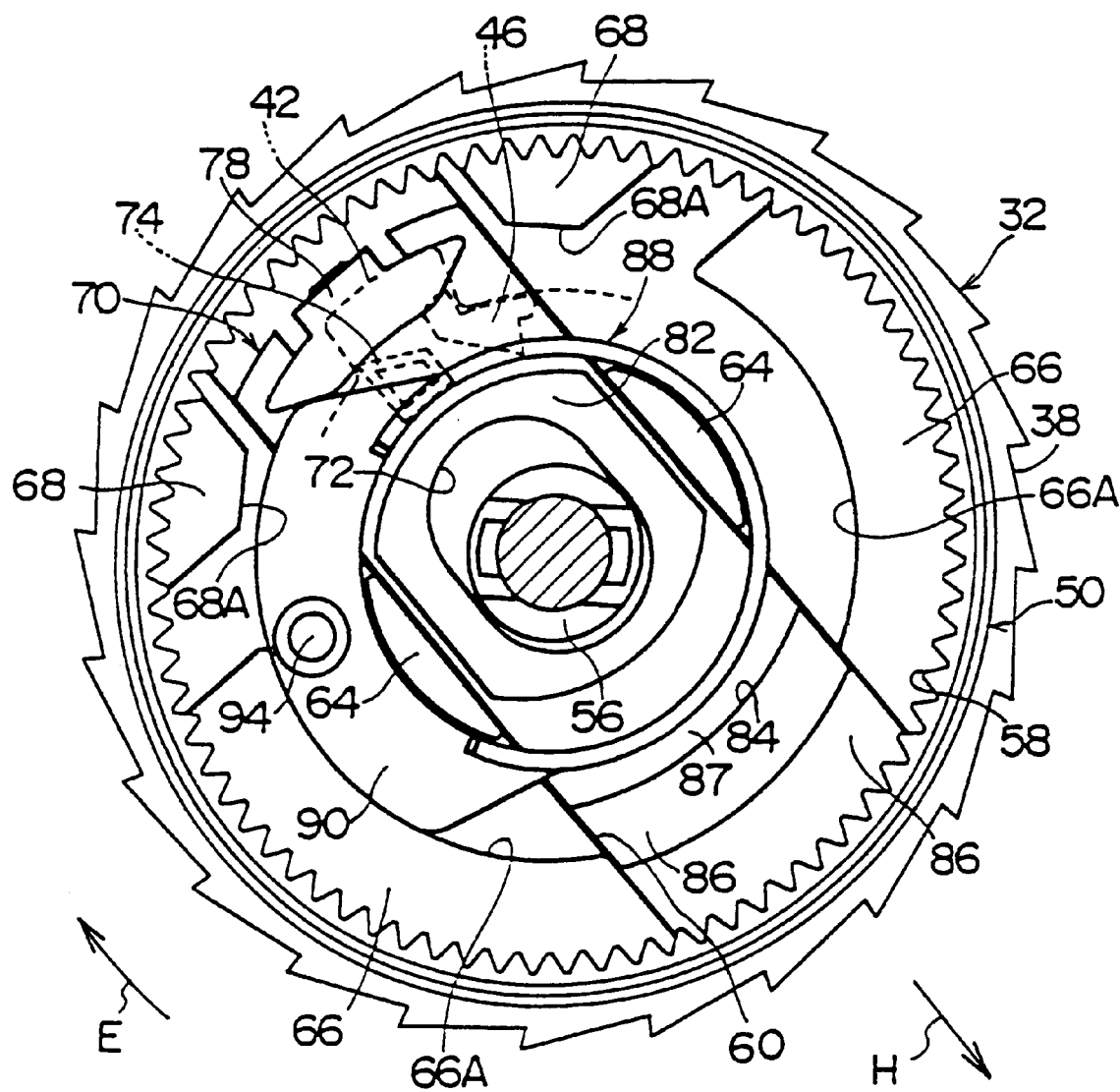
FIG. 3 is a schematic plan view that illustrates a state in which the switching from ALR to ELR has been completed, in the main portions for structuring the end lock prevention mechanism of the webbing take-up device relating to the present embodiment.

From this state, in the state shown in FIG. 3 (corresponding to FIG. 14) in which the webbing 17 is further taken up by the take-up shaft 14, and the switching operation from ALR to ELR has been completed, in accordance with the movement of the slider 70 in the direction opposite to arrow H, the boss portion 74 moves along the guide hole 62 from FIG. 9 to FIG. 10, is inserted into a side surface of the insertion portion 42 and the braking member 46, and is set in a state shown in FIG. 10 in which the take-up shaft 14 and the rotor member 50, and the lock wheel 72 are prevented from operating relatively with each other.

From a state shown in FIG. 3, when the entire amount of the webbing 17 is further taken up, in accordance with this movement, the cam plate 88 rotates in the direction of arrow E while the cam plate 88 is being supported and received by the guide shaft table portion 64. The cam plate portion 90 presses the circular arc surface 76B, presses the following portion 78, and goes on press the slider 70 in the direction opposite to arrow H, and is set in a state shown in FIG. 4. Moreover, in this state shown in FIG. 4, in the same manner as the above-described state shown in FIG. 3, a state which is shown in FIG. 10 is set in which the lock wheel 72 is prevented from operating relatively with the take-up shaft 14 and the rotor member 50.

Figure 4:
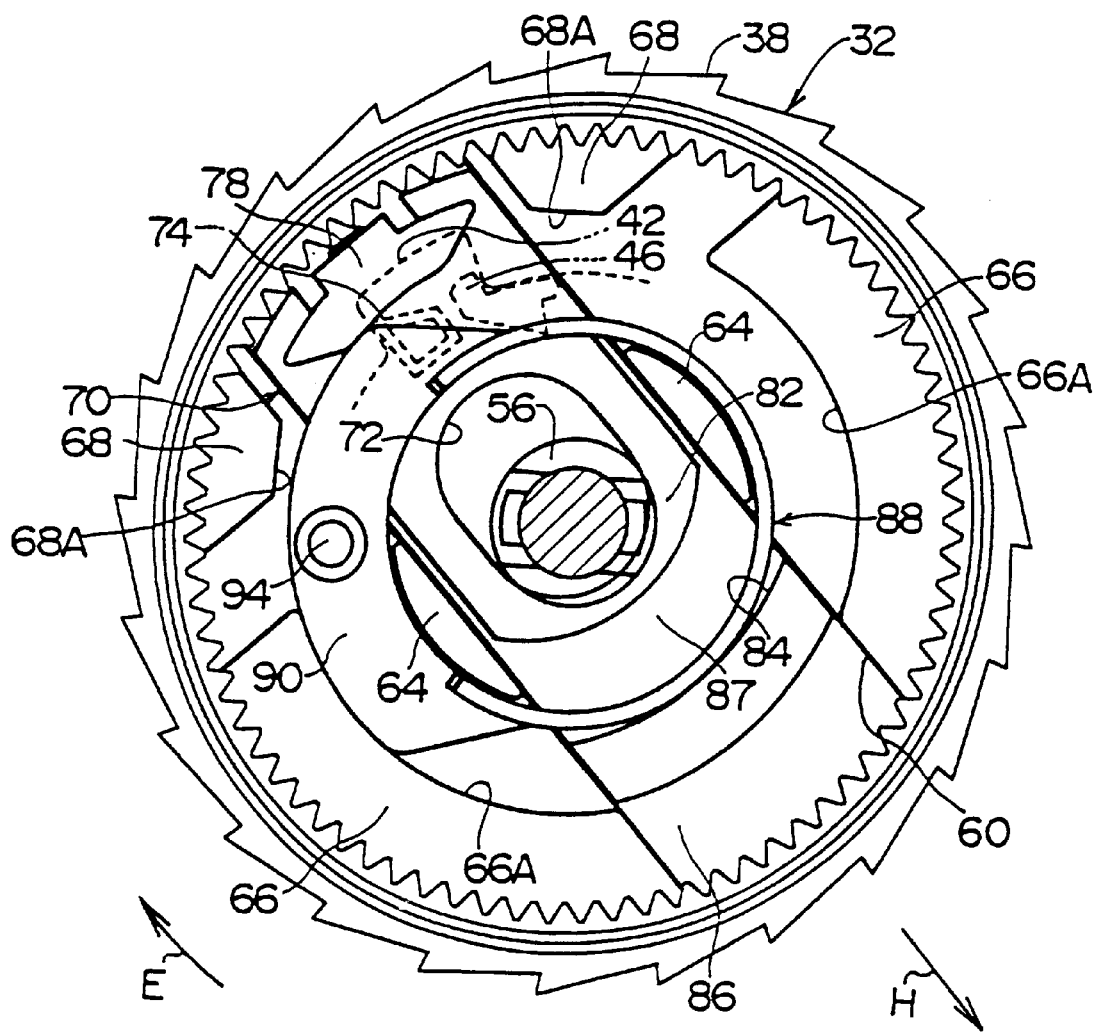
FIG. 4 is a schematic plan view that illustrates a state in which the entire webbing has been stored, in the main portions for structuring the end lock prevention mechanism of the webbing take-up device relating to the present embodiment.

Namely, as respectively shown in FIGS. 3, 4, and 10, the webbing take-up device changes from a state in which almost the entire amount of the webbing is taken up, to a state in which taking-up of the entire amount of the webbing has been completed, and returns to a state in which almost the entire amount of the webbing is taken up. During this state, the lock wheel 32 is in a state in which it cannot rotate relatively with the take-up shaft 14 and the rotor member 50. Meanwhile, since the lock plates 22 maintain a state shown in FIG. 12 in which the meshing of the lock plates 22 with the internally toothed gear 26 is cancelled, during this state, the taking-up and pulling-out operation of the webbing 17 are not prevented.

Further, even when the pulled-out webbing 17 is rapidly taken up by the take-up shaft 14 until the entire amount of the webbing is taken up, and the taking-up operation is rapidly terminated, the inertia force from the inertia member 40 is received by the boss portion 74 between the insertion portion 42 and the braking member 46 so as to prevent the rotor member 50 and the lock wheel 72 from rotating relatively with each other. Accordingly, it is possible to carry out reliably such a so-called end lock preventing operation as described above, through a gear mechanism.

Further, in the present embodiment, in order to rotate the cam plate 88, the structure of the gear mechanism in which a large reduction ratio has been realized by using the planet gear has been described. However, the present invention is not limited to this. An entraining transmission mechanism, and other reduction transmission mechanisms can be employed instead.

Industrial Applicability

As described above, the webbing take-up device according to the present invention is -useful for a webbing take-up device in a seat belt system for protecting a vehicle occupant seated on a vehicle seat in a vehicle such as an automobile or the like, and is particularly suitable for the webbing take-up device having the end lock prevention mechanism.

What is claimed is:

1. A webbing take-up device, comprising:
   a frame which is mounted to a vehicle;
   a take-up shaft which is axially supported at said frame, and which takes up a webbing for restraining a vehicle occupant;
   a lock wheel which following rotates around the take-up shaft, and which rotates relatively with the take-up shaft due to rapid rotation of the take-up shaft;
   lock means which prevents the take-up shaft from rotating in a direction in which the webbing is pulled out when said lock wheel and the take-up shaft rotate relatively with each other;
   a planet gear which revolves around an axis core of the take-up shaft due to rotation of the take-up shaft and transmits reduced rotation of the take-up shaft as a revolution rotational frequency; and
   end lock preventing means which is driven in accordance with revolution of said planet gear and prevents said lock wheel and said take-up shaft from rotating relatively with each other in between a state in which almost the entire amount of the webbing is taken up by the take-up shaft and a state in which the entire amount of the webbing is taken up by the take-up shaft,
   wherein said planet gear comprises a missing-teeth gear portion, which meshes with a first gear that rotates due to reduction of the rotation of said take-up shaft, and a full-teeth gear portion, which meshes with a second gear that rotates in accordance with the rotation of said take-up shaft, and revolves by the difference between rotations of said first gear and of said second gear.

2. A webbing take-up device according to claim 1, wherein said end lock preventing means comprises:
   an annular cam plate member which axially supports said planet gear and which rotates axially around said take-up shaft in accordance with the revolution of said planet gear; and
   a slide member which moves between a first position wherein said lock wheel and said take-up shaft are prevented from rotating relatively with each other in accordance with rotation of said cam plate member, and a second position where said lock wheel and said take-up shaft are allowed to rotate relatively with each other.

3. A webbing take-up device according to claim 2, wherein said slide member has a boss portion that engages with said lock wheel and prevents said lock wheel and said take-up shaft from rotating relatively with each other, in said first position.

4. A webbing take-up device according to claim 3, wherein said cam plate member has an arc-shaped cam portion which presses said slide member such that said slide member moves between said first position and said second position.

5. A webbing take-up device having webbing sensitive type lock means, comprising:
   a rotor member which rotates integrally with a take-up shaft which takes up said webbing;
   a lock wheel which is rotatably supported at said take-up shaft and which prevents said take-up shaft from rotating in a direction in which said webbing is pulled out when said take-up shaft and said lock wheel rotate relatively with each other;

a braking member which is supported by said rotor member so as to be movable, which is inserted into an insertion portion for braking provided at said lock wheel so as to prevent said rotor member and said lock wheel from rotating relatively with each other, and which is removed from said insertion portion for braking so as to allow said rotor member and said lock wheel to rotate relatively with each other; and reduction interlocking means which interlocks with rotation of said take-up shaft, which inserts said braking means into said insertion portion for braking between the state in which almost an entire amount of said webbing is taken up and a state in which the entire amount of said webbing is taken up, and which removes said braking member from said insertion portion for braking in between a state in which almost the entire amount of said webbing is taken up and a state in which the entire amount of said webbing is pulled out, wherein said reduction interlocking means comprises a gear mechanism having a planet gear;

said gear mechanism comprises a first gear which is provided at a rotational member and which is reduced to rotate in accordance with the rotation of said take-up shaft, and a second gear which is provided at said rotor member and which rotates in accordance with the rotation of said rotor member, and said planet gear includes a missing-teeth gear portion which meshes with said first gear and a full-teeth gear portion which meshes with said second gear, and revolves by the difference between rotations of said first gear and said second gear.

6. A webbing take-up device according to claim 5, wherein said reduction interlocking means has an annular cam plate member which axially supports said planet gear thereat and which rotates axially around said take-up shaft in accordance with revolution of said planet gear, and said braking member has a slide member which moves between a first position where said lock wheel and said take-up shaft are prevented from rotating relatively with each other in accordance with rotation of said cam plate member, and a second position where said lock wheel and said take-up shaft are allowed to rotate relatively with each other.

7. A webbing take-up device according to claim 6, wherein said slide member has a boss portion which engages with said lock wheel so as to prevent said take-up shaft and said lock wheel from rotating relatively with each other, at said first position.

8. A webbing take-up device according to claim 7, wherein said cam plate member has an arc-shaped cam portion which presses said slide member such that said slide member moves between said first position and said second position.

* * * * *